(12) United States Patent
Hayashi et al.

(10) Patent No.: US 12,258,087 B2
(45) Date of Patent: Mar. 25, 2025

(54) SADDLE-RIDE VEHICLE

(71) Applicant: HONDA MOTOR CO., LTD., Tokyo (JP)

(72) Inventors: Takazumi Hayashi, Tokyo (JP); Yuya Nonoyama, Tokyo (JP); Kanji Hayashi, Tokyo (JP); Kota Murakami, Tokyo (JP); Yoichi Nishida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 305 days.

(21) Appl. No.: 17/951,470

(22) Filed: Sep. 23, 2022

(65) Prior Publication Data
US 2023/0108328 A1    Apr. 6, 2023

(30) Foreign Application Priority Data

Sep. 30, 2021    (JP) .................................. 2021-162132

(51) Int. Cl.
*B62J 15/02*    (2006.01)
*B62J 15/00*    (2006.01)
*B62J 17/10*    (2020.01)

(52) U.S. Cl.
CPC ...................... *B62J 15/00* (2013.01)

(58) Field of Classification Search
CPC ... B62J 15/02; B62J 15/00; B62J 17/10; B62J 9/24; B62J 1/28
See application file for complete search history.

(56) References Cited

U.S. PATENT DOCUMENTS

| | | | |
|---|---|---|---|
| 7,325,639 B2* | 2/2008 | Yamaguchi | B62J 15/00 |
| | | | 280/852 |
| 9,878,756 B2* | 1/2018 | Wakita | B62J 15/00 |
| 11,167,815 B2* | 11/2021 | Katagiri | B60R 11/04 |
| 12,054,215 B2* | 8/2024 | Ishii | B62J 15/02 |

FOREIGN PATENT DOCUMENTS

| | | |
|---|---|---|
| EP | 2 719 611 A1 | 4/2014 |
| JP | H4-66380 A | 3/1992 |
| JP | H5-338571 A | 12/1993 |
| JP | 2004-338428 A | 12/2004 |
| JP | 2008-024226 | 2/2008 |
| JP | 2014-76760 A | 5/2014 |
| JP | 2020-196364 A | 12/2020 |
| JP | 2022-144721 A | 10/2022 |

OTHER PUBLICATIONS

Japanese Office Action dated Jun. 6, 2023 issued in the corresponding Japanese application No. 2021-162132; English machine translation included (7 pages).

\* cited by examiner

*Primary Examiner* — John D Walters
(74) *Attorney, Agent, or Firm* — Rankin, Hill & Clark LLP

(57) ABSTRACT

In the saddle-ride vehicle, a front fork includes a fender support portion, the fender support portion is located on an inner side of a vehicle body relative to an inner surface of the front fender, and a fork guard is disposed on a rear side of the fender support portion, and the fork guard extends to an inner side of the vehicle body relative to the fender support portion. In the saddle-ride vehicle, the front fender includes an extending portion extending from the inner surface of the front fender to an inner side of the vehicle body, and the extending portion is disposed in front of a space formed between the fender support portion and the inner surface of the front fender.

10 Claims, 21 Drawing Sheets

SADDLE-RIDE VEHICLE

INCORPORATION BY REFERENCE

The present application claims priority under 35 U.S.C. § 119 to Japanese Patent Application No. 2021-162132 filed on Sep. 30, 2021. The content of the application is incorporated herein by reference in its entirety.

BACKGROUND OF THE INVENTION

Field of the Invention

The present invention relates to a saddle-ride vehicle.

Description of the Related Art

Conventionally, in a saddle-ride vehicle, a technology of providing a front fender with a fork guard that protects a front fork is known (see, for example, Japanese Patent Laid-Open No. 2008-24226). The fork guard of Japanese Patent Laid-Open No. 2008-24226 is located on a rear side of a fender support portion and is installed to enter an inner side of a vehicle body relative to front of the front fork.

SUMMARY OF THE INVENTION

On an inner side of a front fender in a vehicle width direction, however, in a case where there is a space between an upper end of a fender support portion and a front surface of a fork guard, above the upper end of the fender support portion, in front of the fork guard, or in a case where there is a space between the fender support portion and an inner surface of the fender in front of the fork guard, such a space has a shape that is surrounded by the fork guard and the inner surface of the fender, and hence air might be accumulated in the space.

An object of the present invention, which has been made in view of actual situations described above, is to provide a saddle-ride vehicle that makes it difficult for running wind entering an inner side of a front fender to enter air accumulation and that can smoothly guide the running wind entering the inner side of the front fender.

Provided is a saddle-ride vehicle including a front fender that covers a front wheel from above; a front fork, the front fork including a fender support portion that supports the front fender, the fender support portion being located on an inner side of a vehicle body relative to an inner surface of the front fender; and a fork guard disposed on a rear side of the fender support portion, the fork guard extending to an inner side of the vehicle body relative to the fender support portion, wherein the front fender includes an extending portion extending from the inner surface of the front fender to an inner side of the vehicle body, and the extending portion is disposed in front of a space formed between the fender support portion and the inner surface of the front fender.

It is possible to provide a saddle-ride vehicle that makes it difficult for running wind entering an inner side of a front fender to enter air accumulation and that can smoothly guide the running wind entering the inner side of the front fender.

DETAILED DESCRIPTION OF THE PREFERRED EMBODIMENTS

Figure 1:
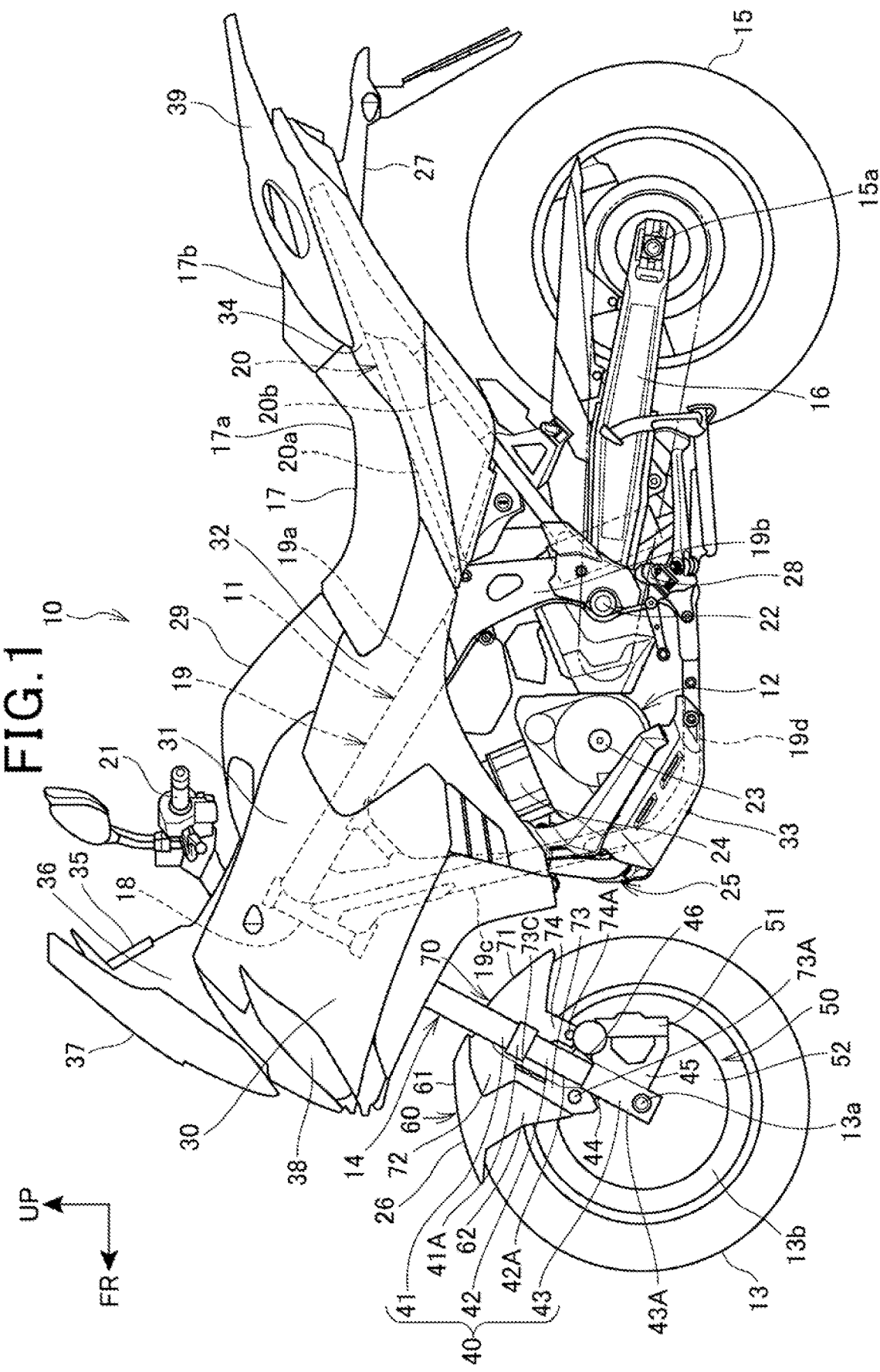
FIG. 1 is a side view of a saddle-ride vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

In the present embodiment, the front frame 19 includes a pair of left and right mainframes 19a extending downward and rearward from the head pipe 18, a pivot frame 19b extending downward from a rear end portion of each mainframe 19a, a down frame 19c extending downward from a position below a front end of the mainframe 19a in the head pipe 18, and a pair of left and right lower frames 19d extending downward and rearward from a lower end of the down frame 19c, then extending rearward and being connected to a lower end portion of the pivot frame 19b.

The rear frame 20 includes a pair of left and right seat frames 20a extending upward and rearward from an upper part of the left and right pivot frames 19b to a rear end portion of the vehicle, and a pair of left and right rear subframes 20b extending from intermediate portions of the left and right pivot frames 19b in an up-down direction to rear end portions of the seat frames 20a, respectively.

The saddle-ride vehicle 10 includes a vehicle body cover 30 that covers the vehicle body including the vehicle body frame 11, the power unit 12 and others.

The vehicle body cover 30 includes a front cowl 31 that covers upper parts of the head pipe 18 and the front fork 14 from front and left and right sides, and a pair of left and right side covers 32 that cover a side surface of the fuel tank 29 from outside on a rear side of the front cowl 31.

Also, the vehicle body cover 30 includes an undercover 33 that covers the crankcase 23 from below, and a pair of left and right rear covers 34 that cover a lower part of the seat 17 from sides, on a rear side of each side cover 32.

At an upper part of the front cowl 31, a meter visor 36 that covers a meter 35 is provided. The meter visor 36 includes a plate-shaped windscreen 37 extending upward and rearward.

The front cowl 31 includes a pair of left and right headlights 38.

Figure 2:
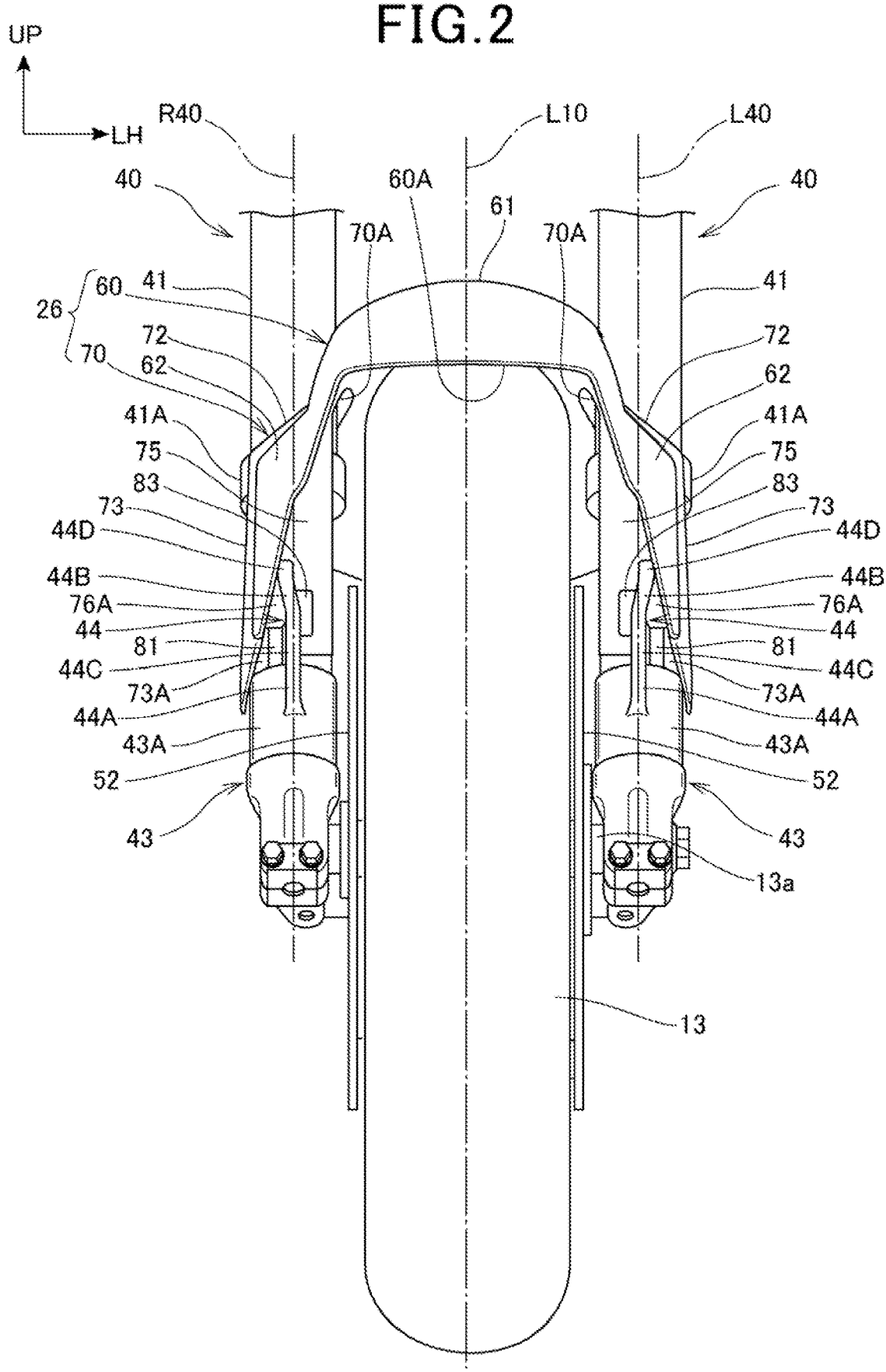
FIG. 2 is a front view showing a peripheral part of a front wheel of the saddle-ride vehicle according to a first embodiment.

FIG. 2 is a front view showing a peripheral part of the front wheel 13 of the saddle-ride vehicle 10 according to the first embodiment.

The front fork 14 includes a steering shaft (not shown) that is pivotally supported on the head pipe 18 in a rotatable manner, a top bridge (not shown) that is fixed to an upper end of the steering shaft, a bottom bridge (not shown) fixed to a lower end of the steering shaft (not shown), and a pair of left and right forks 40 supported on the top bridge (not shown) and the bottom bridge (not shown).

As shown in FIG. 1 or 2, each of the forks 40 includes an outer tube 41 forming an upper part, an inner tube 42 that is smaller in diameter than the outer tube 41 and that slidably fits on an inner side of the outer tube 41, and an axle support member 43 fixed to a lower end portion of the inner tube 42. The fork 40 of the present embodiment is an inverted type.

At a lower end of the outer tube 41, an enlarged portion 41A is formed. In an inner peripheral portion of the enlarged portion 41A, an unshown sealing member that seals a gap between an inner peripheral surface of the outer tube 41 and an outer peripheral surface of the inner tube 42 is disposed. The outer tube 41 slides along an outer surface of the inner tube 42 through the unshown sealing member. The enlarged portion 41A of the outer tube 41 can be brought close to an upper end of the axle support member 43. The outer surface of the inner tube 42 constitutes a sliding surface 42A. The axle 13a is supported on left and right axle support members 43. The front wheel (vehicle wheel) 13 is supported on the axle 13a.

The axle support member 43 integrally includes a caliper bracket 45 in a rear part. The axle support member 43 also integrally includes a pair of front and rear fender support portions 44 and 46 in an upper part.

On the caliper bracket 45, a brake caliper 51 is supported. A pair of left and right brake calipers 51 are provided. The brake caliper 51 includes an unshown piston. When a brake fluid pressure is supplied to the brake caliper 51, the brake caliper holds each brake disc 52 fixed to a wheel 13b of the front wheel 13. Thereby, the front wheel 13 is braked. A front wheel brake device 50 of the present embodiment is a double disc type.

The front fender 26 is supported on the fender support portions 44 and 46.

The front fender support portion 44 extends upward from a front upper end portion of the axle support member 43. The rear fender support portion 46 extends upward from an upper end portion of the caliper bracket 45.

Figure 3:
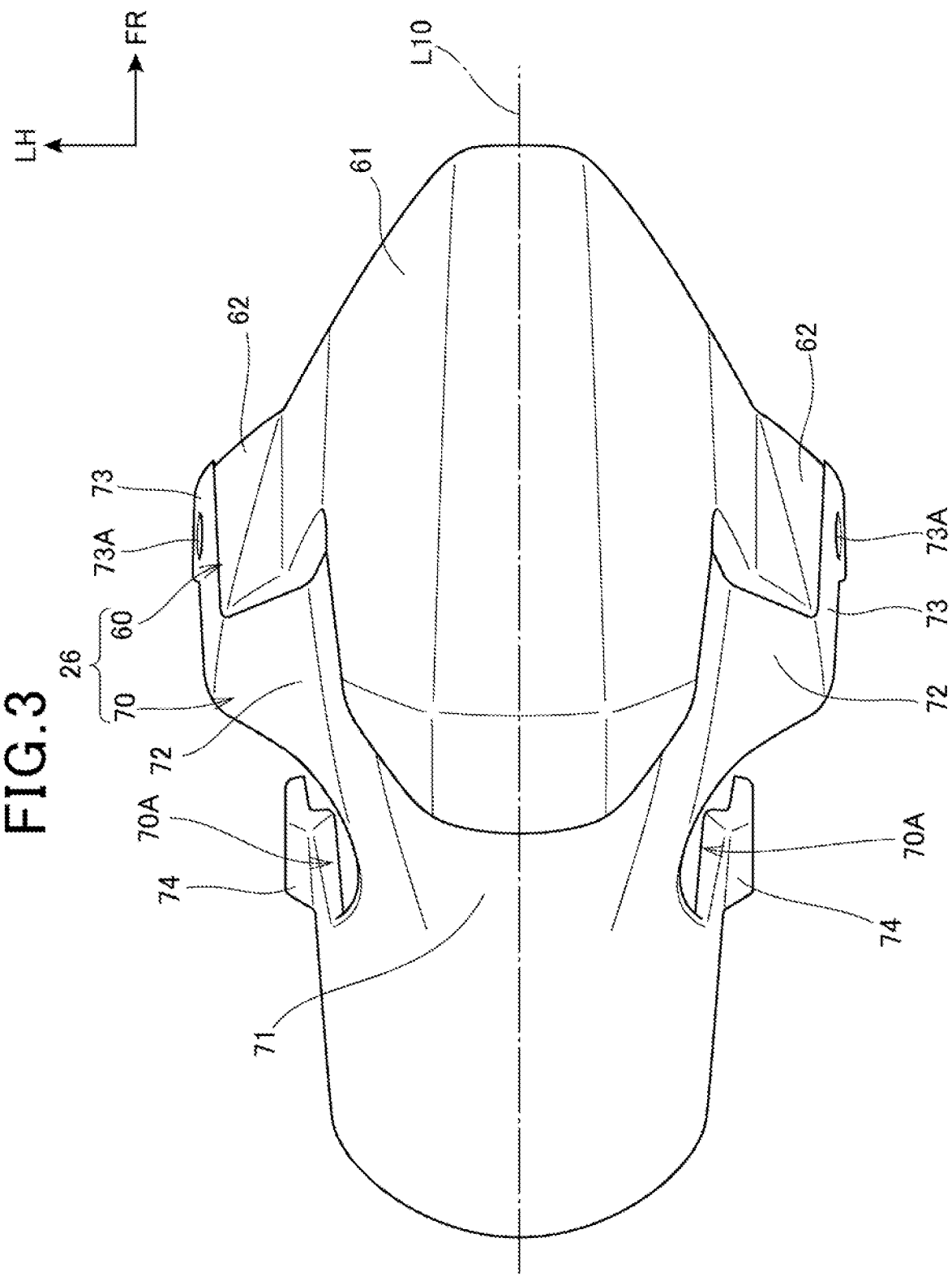
FIG. 3 is a plan view of a front fender.

FIG. 3 is a plan view of the front fender 26.

As shown in FIGS. 1 to 3, the front fender 26 is formed substantially symmetrically with respect to a vehicle centerline L10.

The front fender 26 includes a fender body 70 supported on the axle support member 43, and a fender front portion 60 supported on the fender body 70.

The fender body 70 includes an upper surface portion 71. The upper surface portion 71 is curved to protrude upward in front view, and extends along a circumference of the front wheel 13 in a front-rear direction. The fender body 70 extends astride the fork 40 in the front-rear direction. At a front end portion of the upper surface portion 71, a pair of left and right widening portions 72 are formed. Each of the widening portions 72 extends outward from the inner tube 42 of the fork 40 in the vehicle width direction (see FIG. 2). At an outer end of the widening portion 72 in the vehicle width direction, a front side surface portion 73 extending downward from the outer end in the vehicle width direction is formed.

A mounting portion 73A is formed at a lower part of the front side surface portion 73. The mounting portion 73A is mounted on the front fender support portion 44. The front side surface portion 73 is located in front of the fork 40.

At a rear end portion of the upper surface portion 71, a pair of left and right rear side surface portions 74 are formed. A mounting portion 74A is formed on a lower part of each rear side surface portion 74. The mounting portion 74A is mounted on the rear fender support portion 46. The rear side surface portion 74 is located on a rear side of the fork 40.

Figure 4:
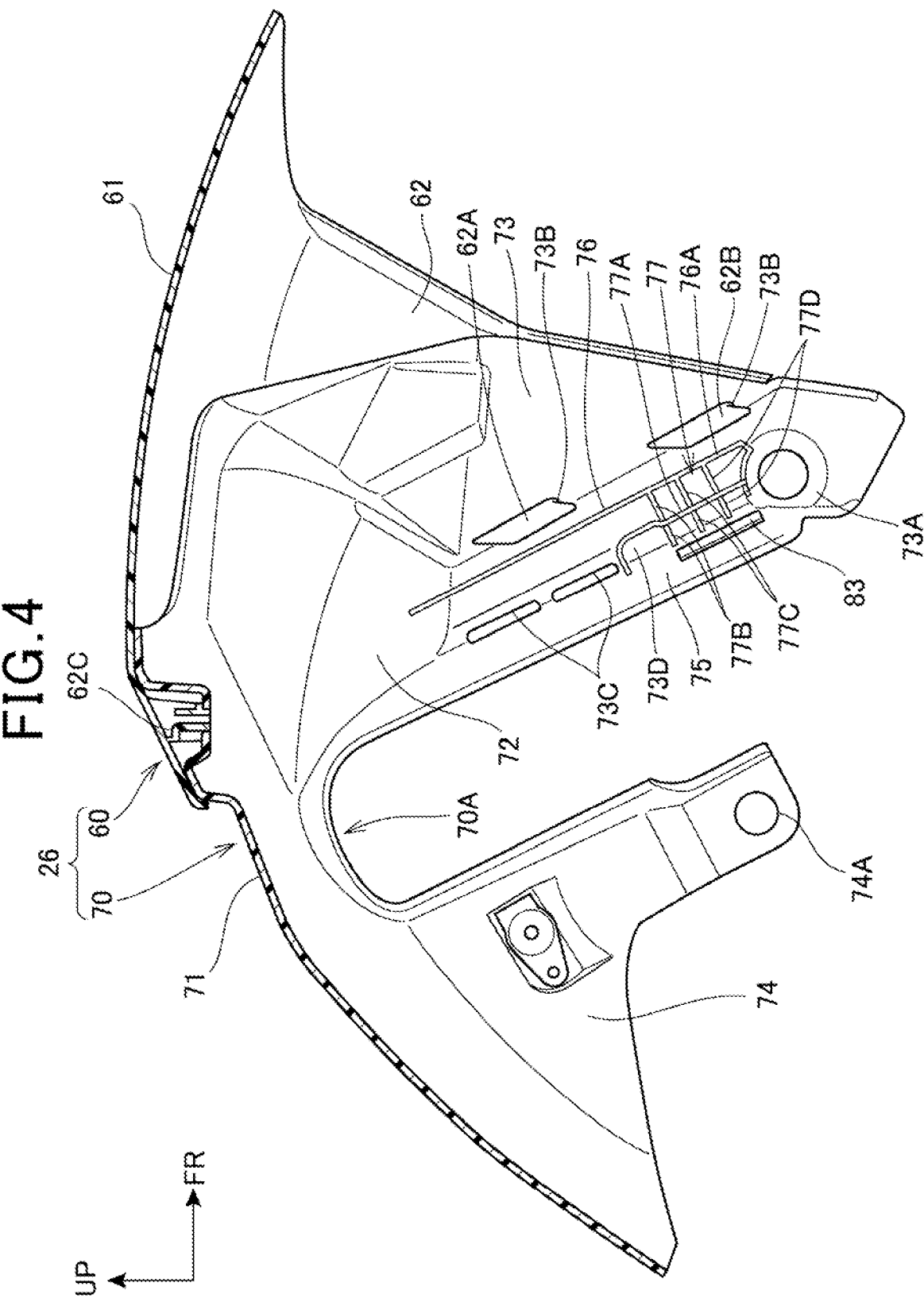
FIG. 4 is a cross-sectional view along a vehicle centerline.
Figure 5:
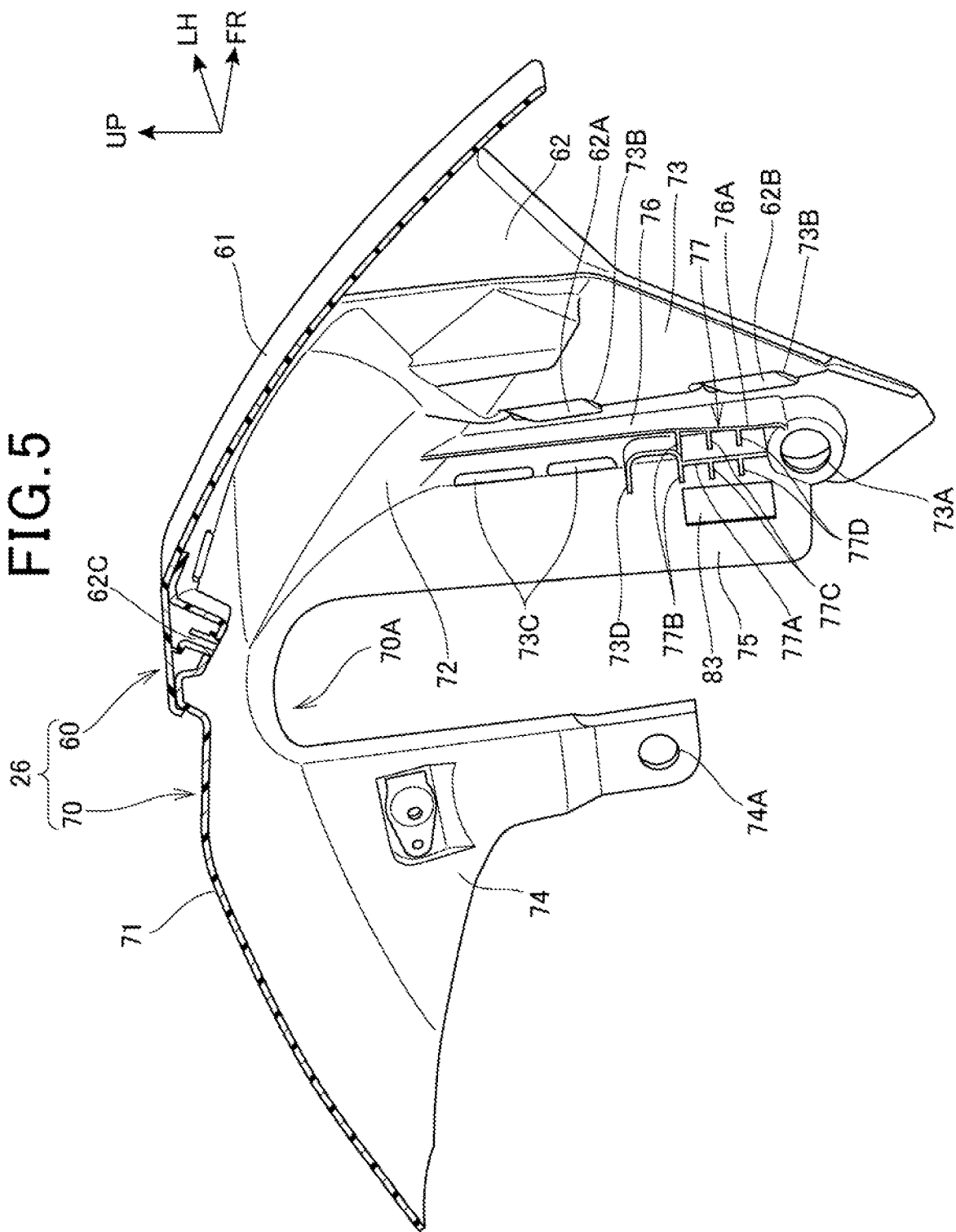
FIG. 5 is a view of a cross section of FIG. 4 seen in an oblique direction.

FIG. 4 is a cross-sectional view along the vehicle centerline L10. FIG. 4 shows a left part of the front fender 26. FIG. 5 is a view of the cross section of FIG. 4 seen in an oblique direction.

On each of left and right sides of the front fender 26, the upper surface portion 71, the widening portion 72, the front side surface portion 73 and the rear side surface portion 74 have a surrounding shape to form a cutout 70A that closes upward and opens downward in the front fender 26 in vehicle side view. The fork 40 is disposed in the cutout 70A along a longitudinal direction of the cutout 70A. The enlarged portion 41A of the outer tube enters an inner side of the front fender 26 in the vehicle width direction (the inner side of the vehicle body) through the cutout 70A, and is exposed forward (see FIG. 2).

As shown in FIGS. 1 to 5, the fender front portion 60 is supported on the fender body 70.

The fender front portion 60 includes a front upper surface portion 61. The front upper surface portion 61 has an elliptic shape extending in the front-rear direction in planar view. On opposite sides of a front portion of the front upper surface portion 61 in the vehicle width direction, a pair of left and right connecting portions 62 extending downward are formed. In each of the connecting portions 62, a pair of upper and lower engagement pieces 62A and 62B (see FIGS. 4 and 5) are formed. The engagement pieces 62A and 62B are inserted into slit-shaped insertion holes 73B and 73B, respectively, the holes being formed in the front side surface portion 73 of the fender body 70 (see FIGS. 4 and 5). Thereby, the fender front portion 60 is positioned at the fender body 70. The fender front portion 60 has an upper rear portion 62C fixed to the upper surface portion 71 of the fender body 70 by use of an unshown tapping screw.

On a front side of the front fender 26, an opening 60A opening forward is formed by the front upper surface portion 61 and the pair of left and right connecting portions 62. Through this opening 60A, running wind enters the inner side of the front fender 26, that is, between the front fender 26 and the front wheel 13.

As shown in FIGS. 4 and 5, the mounting portion 73A protruding inward in the vehicle width direction is formed at a lower end portion of the front side surface portion 73. The mounting portion 73A is formed in a cylindrical shape in which a fastening hole is formed.

Above the mounting portion 73A, an engagement wall 73D with an open rear is formed. The engagement wall 73D is a wall that protrudes inward from an inner surface of the front side surface portion 73 in the vehicle width direction. The engagement wall 73D opens inward in the vehicle width direction.

A fork guard 75 extending inward from the inner surface of the front side surface portion 73 in the vehicle width direction is formed on a rear side of the mounting portion 73A and the engagement wall 73D, that is, at a rear end of the front side surface portion 73. The fork guard 75 is integrally formed on the front side surface portion 73. The fork guard 75 curves along the sliding surface 42A in front of the sliding surface 42A of the inner tube 42. Specifically, the fork guard 75 is curved to protrude forward and extends to curve rearward as being inward in the vehicle width direction (see FIG. 10). The fork guard 75 protects the sliding surface 42A of the front fork 14 from front. Therefore, even if sand, stones and the like enter the inner side of the front fender 26 during riding, the sand and the like are prevented from hitting the sliding surface 42A.

In front of the fork guard 75, a slit-shaped vent 73C is formed. The vent 73C extends along the fork guard 75. A pair of upper and lower vents 73C are formed. The vent 73C allows the running wind entering an interior of the front fender 26 to escape to outside.

On the inner surface of the front side surface portion 73, a plate-shaped extending portion 76 extending inward in the vehicle width direction (inward in a left-right direction, to the inner side of the vehicle body) is formed. The extending portion 76 also extends in the front-rear direction. Specifically, the extending portion 76 extends along a mounting angle of the fork 40. The extending portion 76 extends from an inner surface of the widening portion 72 to the front of the mounting portion 73A. The extending portion 76 is located in front of the fender support portion 44. The extending portion 76 has a lower end portion 76A formed so that the lower end portion does not overlap with a position of the fender support portion 44 in the up-down direction in front view.

In the present embodiment, an extension amount for the extending portion 76 refers to a length of the extending portion extending inward from the inner surface of the front side surface portion 73 in the vehicle width direction (inward in the left-right direction). In other words, the amount is a protrusion amount from the inner surface of the front side surface portion 73 to the inner side in the vehicle width direction. The extending portion 76 of the present embodiment does not overlap with the fender support portion 44 in front view, and the extension amount of the extending portion 76 is easily suppressed. However, instead, the extending portion 76 may overlap with the fender support portion 44 in front view.

On a rear side of the extending portion 76, a rib 77 is formed. The rib 77 is formed between the mounting portion 73A and the engagement wall 73D. The rib 77 includes a first rib 77A extending along the extending portion 76. An extended position of the first rib 77A, that is, a position of a tip of the first rib extending from the inner surface of the front side surface portion 73 in the vehicle width direction is aligned with a position of a tip of the extending portion 76.

A plurality of ribs 77B, 77C and 77D extending in the front-rear direction are formed around the first rib 77A. The ribs 77B, 77C and 77D are provided at predetermined intervals in the up-down direction. An extension amount of a third rib 77C and a fourth rib 77D is smaller than that of the first rib 77A.

The first rib 77A, the second rib 77B, the third rib 77C and the fourth rib 77D constitute the rib 77 of the present embodiment.

Figure 6:
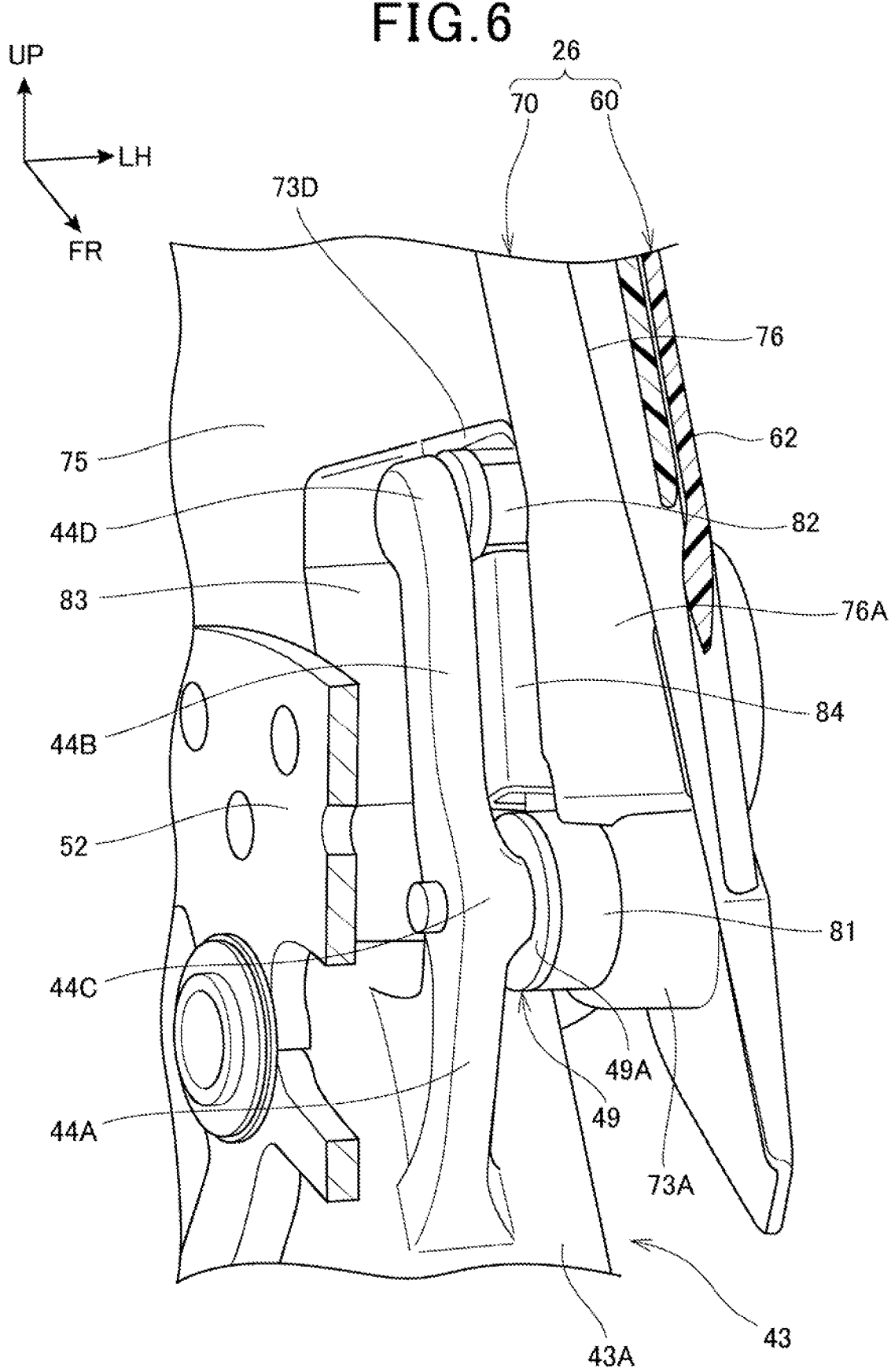
FIG. 6 is a perspective view showing a periphery of a front fender support portion.
Figure 7:
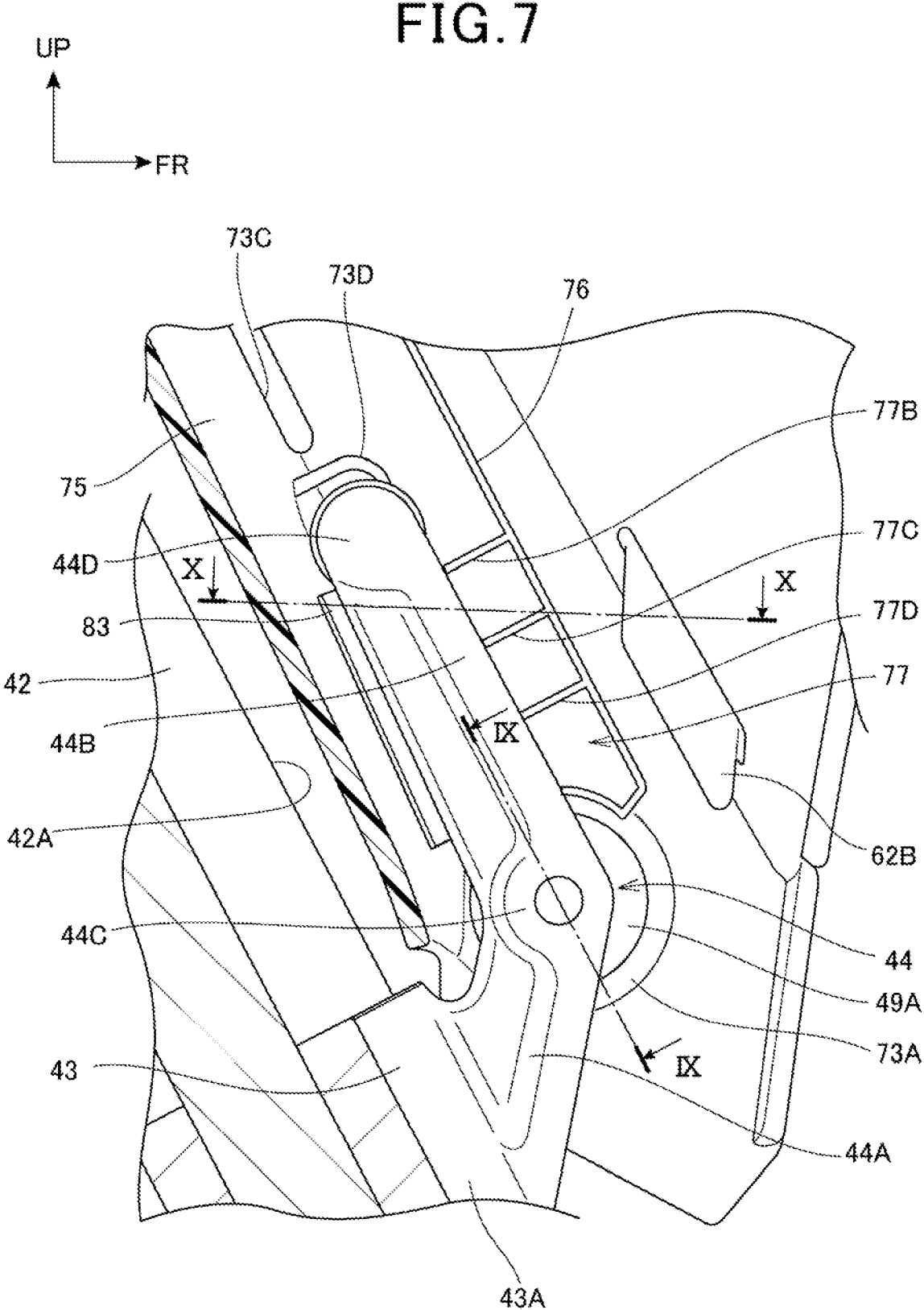
FIG. 7 is a side view showing the periphery of the front fender support portion.
Figure 8:
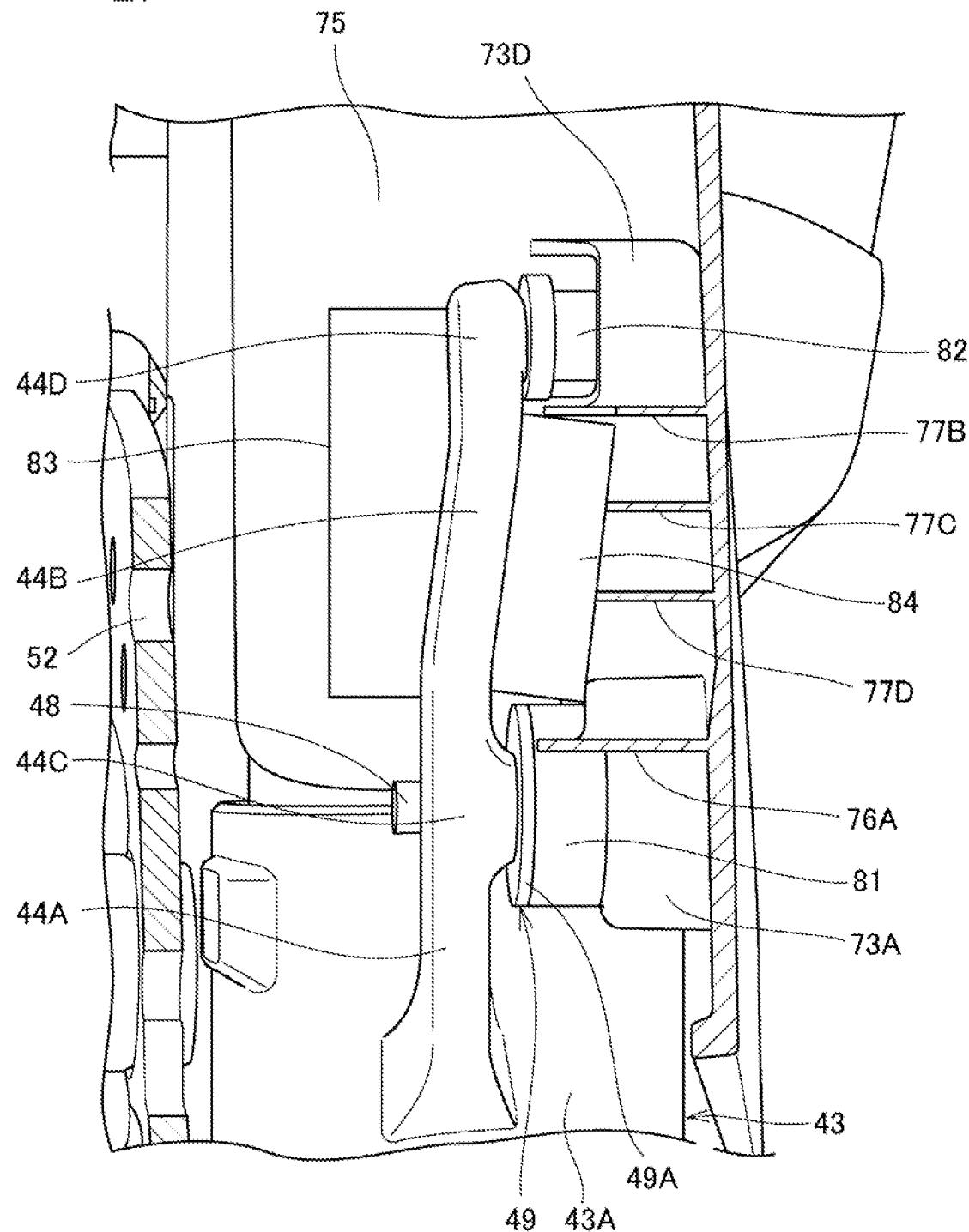
FIG. 8 is a cross-sectional view showing the periphery of the front fender support portion.
Figure 9:
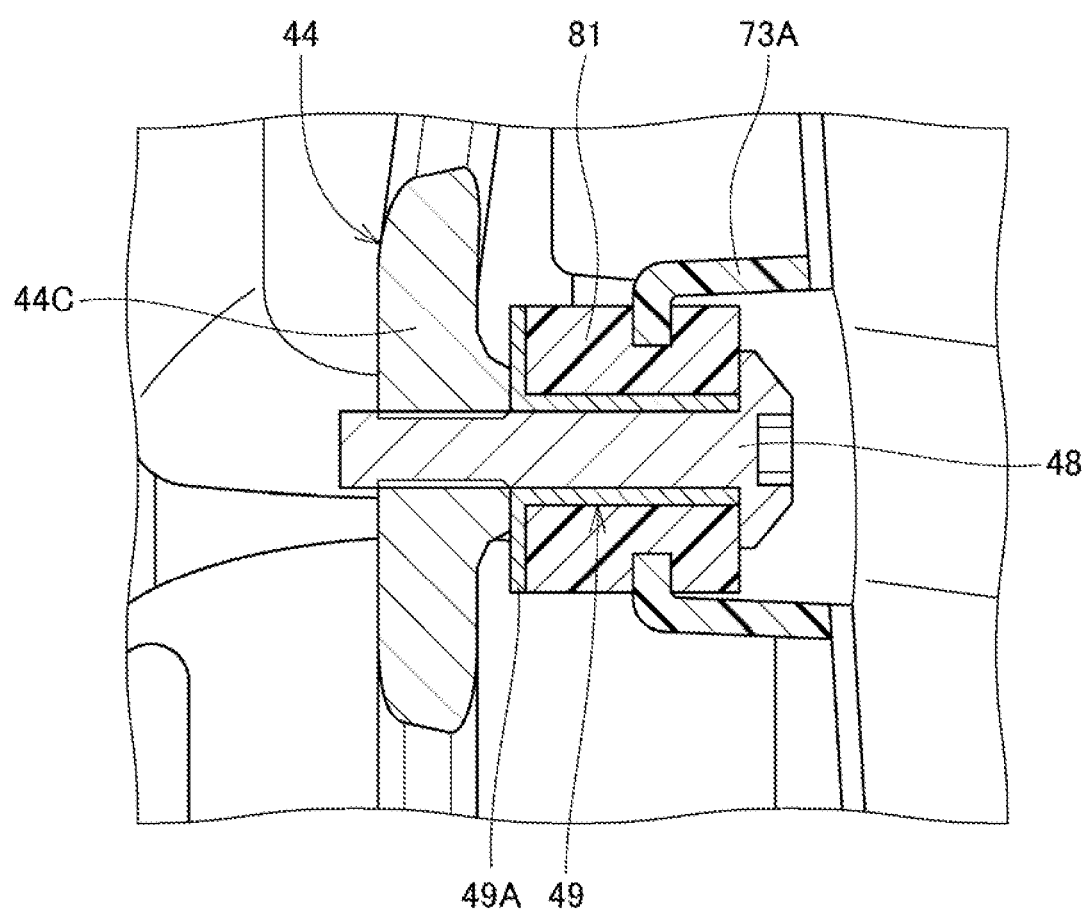
FIG. 9 is a cross-sectional view taken along the line IX-IX of FIG. 7.

FIG. 6 is a perspective view showing a periphery of the front fender support portion 44. FIG. 7 is a side view showing the periphery of the front fender support portion 44. FIG. 8 is a cross-sectional view showing the periphery of the front fender support portion 44. FIG. 9 is a cross-sectional view taken along the IX-IX line of FIG. 7.

As shown in FIGS. 6 to 9, the front side surface portion 73 of the front fender 26 is mounted on the front fender support portion 44.

The front fender support portion 44 includes a protrusion 44A protruding upward from a front surface of a cylinder portion 43A of the axle support member 43. The protrusion 44A is provided on a centerline L40 (see FIG. 2) of the fork 40. At an upper end of the protrusion 44A, a connecting portion 44B extending upward and rearward is formed along the sliding surface 42A of the fork 40. The connecting portion 44B extends upward so as to offset slightly outward from the centerline L40 in the vehicle width direction. Specifically, the connecting portion 44B is inclined outward in the vehicle width direction as being upward. At a lower end of the connecting portion 44B, a fixing portion 44C including a fastening hole is formed. At an upper end of the connecting portion 44B, an engagement portion 44D including a protrusion protruding outward in the vehicle width direction is formed.

The engagement portion 44D of the fender support portion 44 fits with the engagement wall 73D of the front side surface portion 73 via a rubber 82.

Further, the front fender 26 is bolted to the fixing portion 44C of the fender support portion 44 at the mounting portion 73A. Specifically, as shown in FIG. 9, the mounting portion 73A fits in a grommet 81. Through the grommet 81, a brimmed collar 49 is passed from inside in the vehicle width direction. A brim 49A of the brimmed collar 49 is interposed between the fender support portion 44 and the grommet 81. Through a hole in the brimmed collar 49, a bolt 48 is passed from outside in the vehicle width direction. The bolt 48 has a tip portion fastened to the fixing portion 44C of the fender support portion 44. Thereby, the front fender 26 is mounted on the fender support portion 44. In addition, the fixing portion 44C of the fender support portion 44 is seated on the brim 49A of the brimmed collar 49.

In addition, a vibration isolation rubber (vibration isolation pad) 83 that isolates the fork guard 75 from vibration is provided between the fender support portion 44 and the fork guard 75. In the present embodiment, the vibration isolation rubber 83 is provided on a front surface of the fork guard 75 corresponding to the position of the fender support portion 44. The vibration isolation rubber 83 is formed in a plate shape and is bonded to the front surface of the fork guard 75, for example, by use of an adhesive. The fork guard 75 contacts the front fender support portion 44 via the vibration isolation rubber 83. Thereby, the fork guard 75 is isolated from vibration. Further, even if the fork guard 75 is brought close to the fender support portion 44, generation of contact noise due to vibration with the fork guard 75 and the fender support portion 44 can be suppressed.

Figure 10:
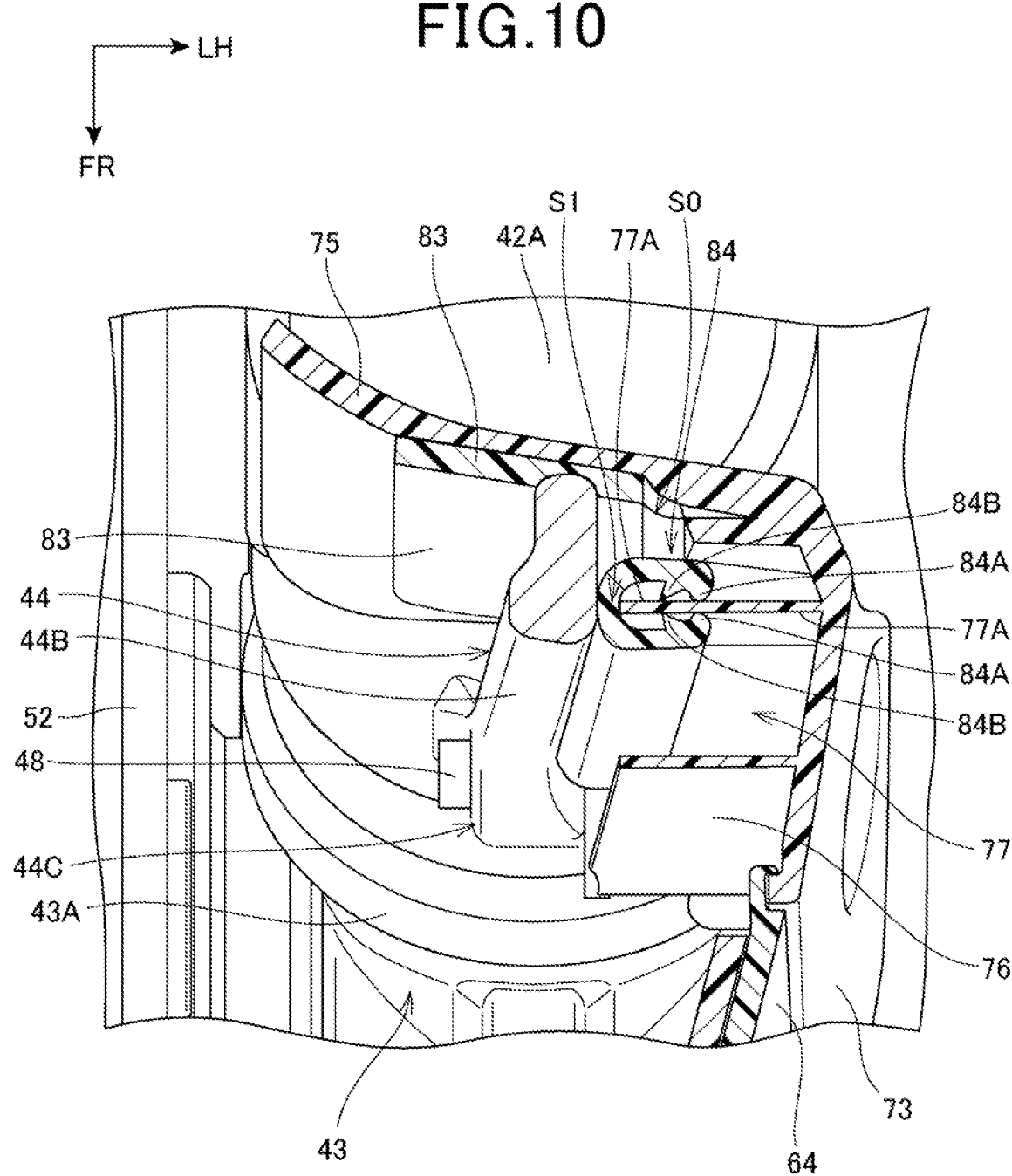
FIG. 10 is a cross-sectional view taken along the line X-X of FIG. 7.
Figure 11:
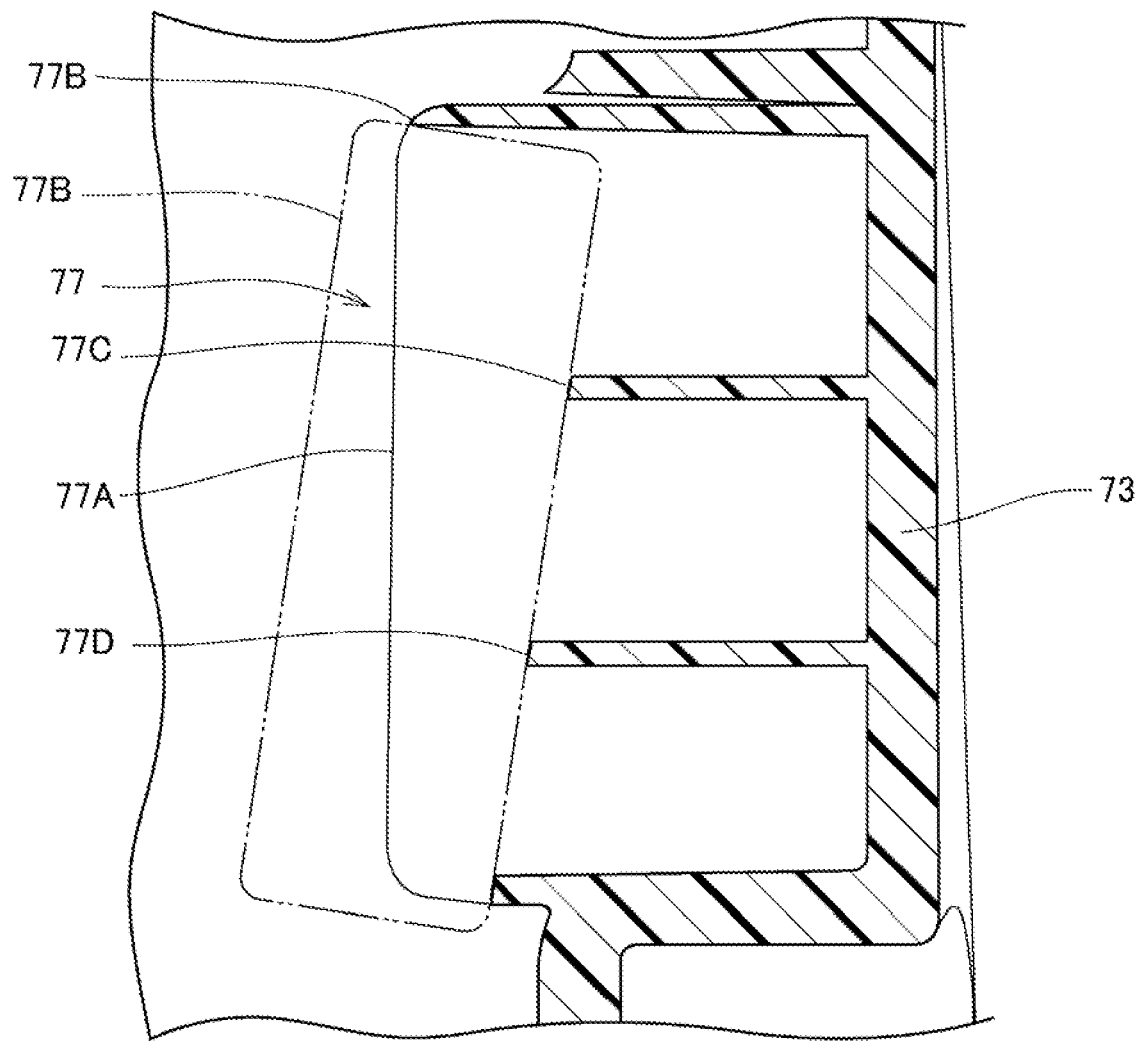
FIG. 11 is a view showing a peripheral part of a rib.

FIG. 10 is a cross-sectional view taken along the X-X line of FIG. 7. FIG. 11 is a view showing a peripheral part of the rib 77.

Between the fender support portion 44 and an inner surface of the front fender 26, a separating portion S1 that is partially separated in front of the fork guard 75 is formed. In the present embodiment, the separating portion S1 is formed between the rib 77 and the fender support portion 44. In other words, an extension amount of the rib 77 is set to generate a gap between the rib and the fender support portion 44. In this separating portion S1, a rubber trim 84 as an example of a closing member is disposed. The separating portion S1 can be sealed with the rubber trim 84.

The rubber trim 84 is a resin member having a substantially U-shaped cross section that covers an extending tip portion of the first rib 77A. In the present embodiment, a holding portion 84A protruding inward is formed in a substantially U-shaped open portion of the rubber trim 84. The holding portion 84A makes it easy to hold the first rib 77A in a thickness direction. A locking portion 84B is formed in the substantial U-shape on a closed side opposite to the holding portion 84A. The locking portion 84B is inclined so as to approach the first rib 77A as being inward in the vehicle width direction. The locking portion 84B makes it easy to increase frictional resistance in the rubber trim 84.

As shown in FIG. 11, the extension amount of the third rib 77C and the fourth rib 77D is set in accordance with inclination of the connecting portion 44B of the fender support portion 44. Specifically, the extension amount of the third rib 77C is set smaller than the extension amount of the fourth rib 77D. Thereby, at the time of assembly, a tip of the rubber trim 84, that is, a holding portion 84A side is brought in contact with the third rib 77C and the fourth rib 77D, so that positioning of the rubber trim 84 is possible. Thereby, when the front fender 26 is mounted on the fender support portion 44, the rubber trim 84 is easily in contact with the fender support portion 44 uniformly in a longitudinal direction of the rubber trim 84.

Here, as shown in FIG. 10, a space S0 sandwiched between an inner surface of the fender support portion 44 and the inner surface of the front side surface portion 73 is formed in front of the fork guard 75. This space S0 is easily surrounded from three directions by the fork guard 75 extending in the vehicle width direction, the front side surface portion 73 extending in the front-rear direction, and the fender support portion 44 extending in the front-rear direction. For this reason, this space S0 tends to easily cause so-called air accumulation. In particular, in the present embodiment, the fork guard 75 protects the sliding surface 42A along which the enlarged portion 41A of the outer tube 41 slides, and therefore easily comes closer to the fender support portion 44 due to the enlarged portion 41A. Therefore, the space S0 tends to have a closed shape, and tends to cause the air accumulation.

On the other hand, in the present embodiment, the extending portion 76 is disposed in front of the space S0. Therefore, running wind is easily guided by the extending portion 76 away from the inner surface of the front side surface portion 73, that is, toward a front wheel 13 side, and the running wind is hard to enter the space S0.

In particular, in the present embodiment, the gap-shaped separating portion S1 that communicates with the space S0 is closed with the rubber trim 84. Therefore, it is easy to inhibit the running wind from entering the space S0, that is, the air accumulation S0.

Figure 12:
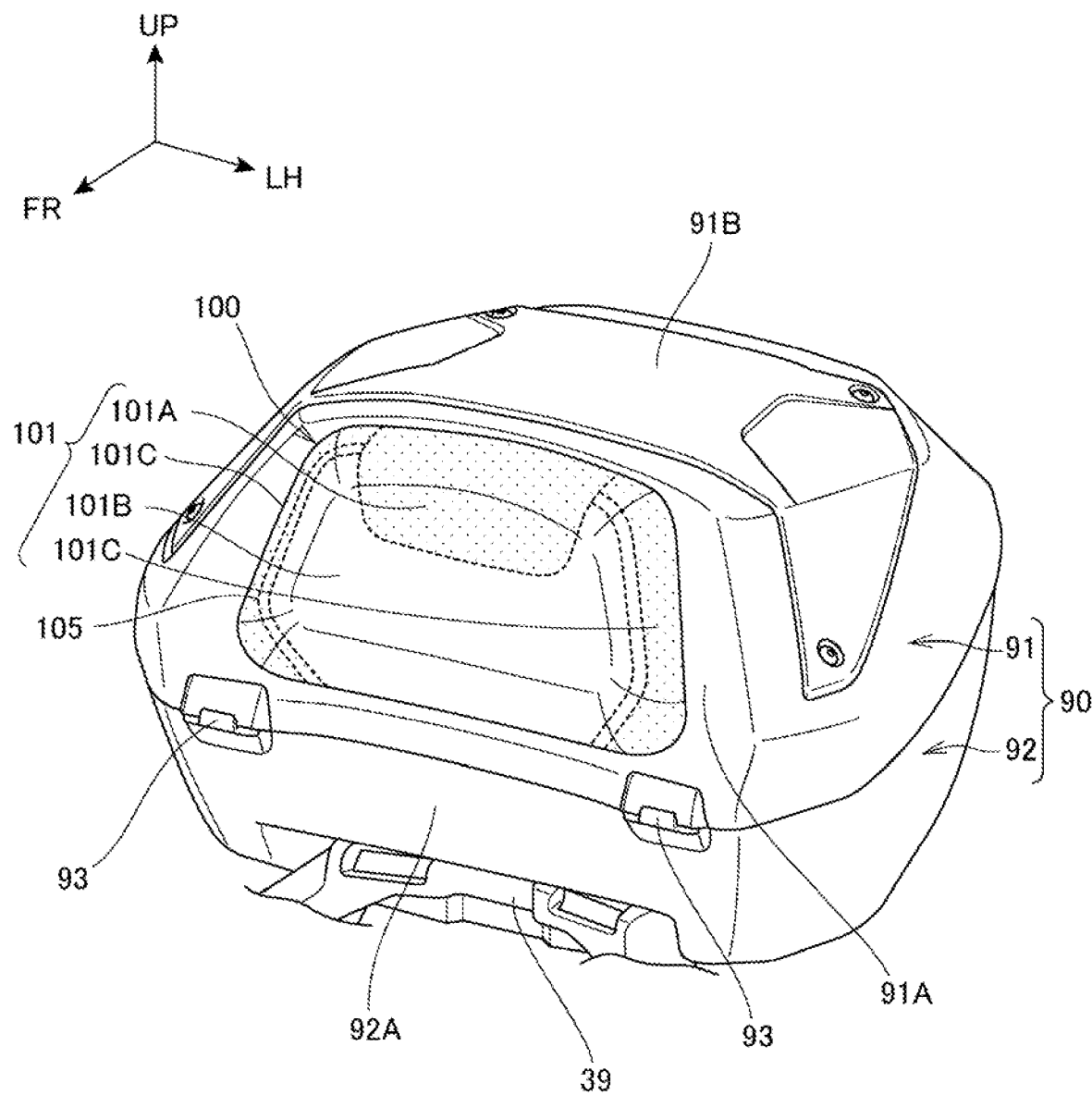
FIG. 12 is a perspective view of a top box mounted on the saddle-ride vehicle.

FIG. 12 is a perspective view of a top box 90 mounted on the saddle-ride vehicle 10.

The saddle-ride vehicle 10 of the present embodiment includes a rear carrier 39 that can be loaded with luggage and the like. The rear carrier 39 is provided on a rear side of the seat 17. Specifically, the seat 17 includes a driver seat 17a (see FIG. 1) and a passenger seat 17b (see FIG. 1), and the rear carrier 39 is provided on a rear side of the passenger seat 17b. The rear carrier 39 is fixed to the seat frame 20a. The top box (storage part) 90 is mounted on the rear carrier 39.

The top box 90 includes a box-shaped box body 92 having an upper part opened, and a box-shaped box lid 91 having a lower part opened. A lower end portion of a front surface 91A of the box lid 91 is coupled to the box body 92 via a hinge 93 provided at an upper end portion of a front surface 92A of the box body 92. The box lid 91 rotates around the hinge 93 to open and close the box body 92.

The front surfaces 91A and 92A of the top box 90 are surfaces extending in the vehicle width direction. The front surfaces 91A and 92A have a central portion slightly recessed rearward in the vehicle width direction. A backrest 100 is mounted on the front surface 91A of the box lid 91.

Figure 13:
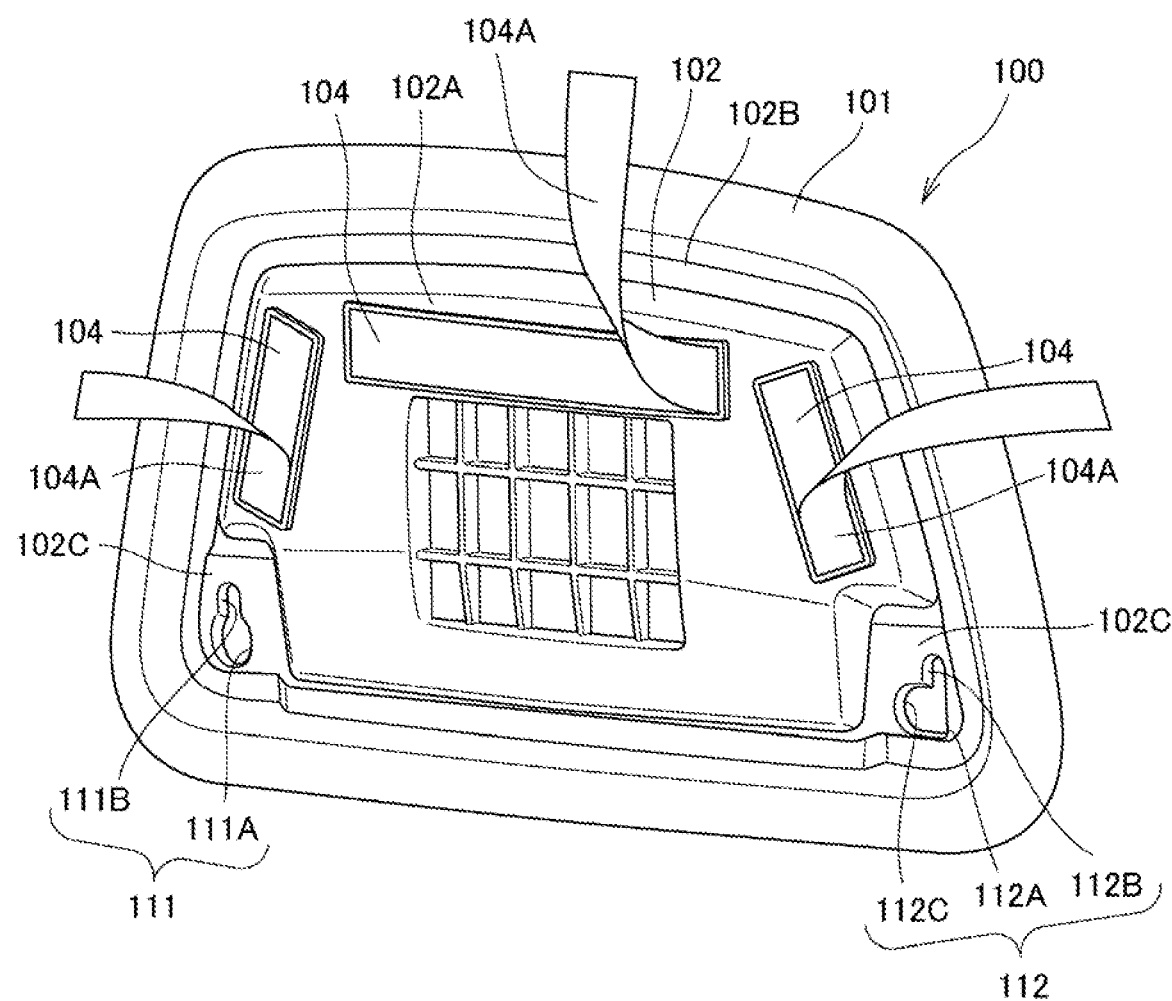
FIG. 13 is a perspective view from a rear surface of a backrest before installed.
Figure 14:
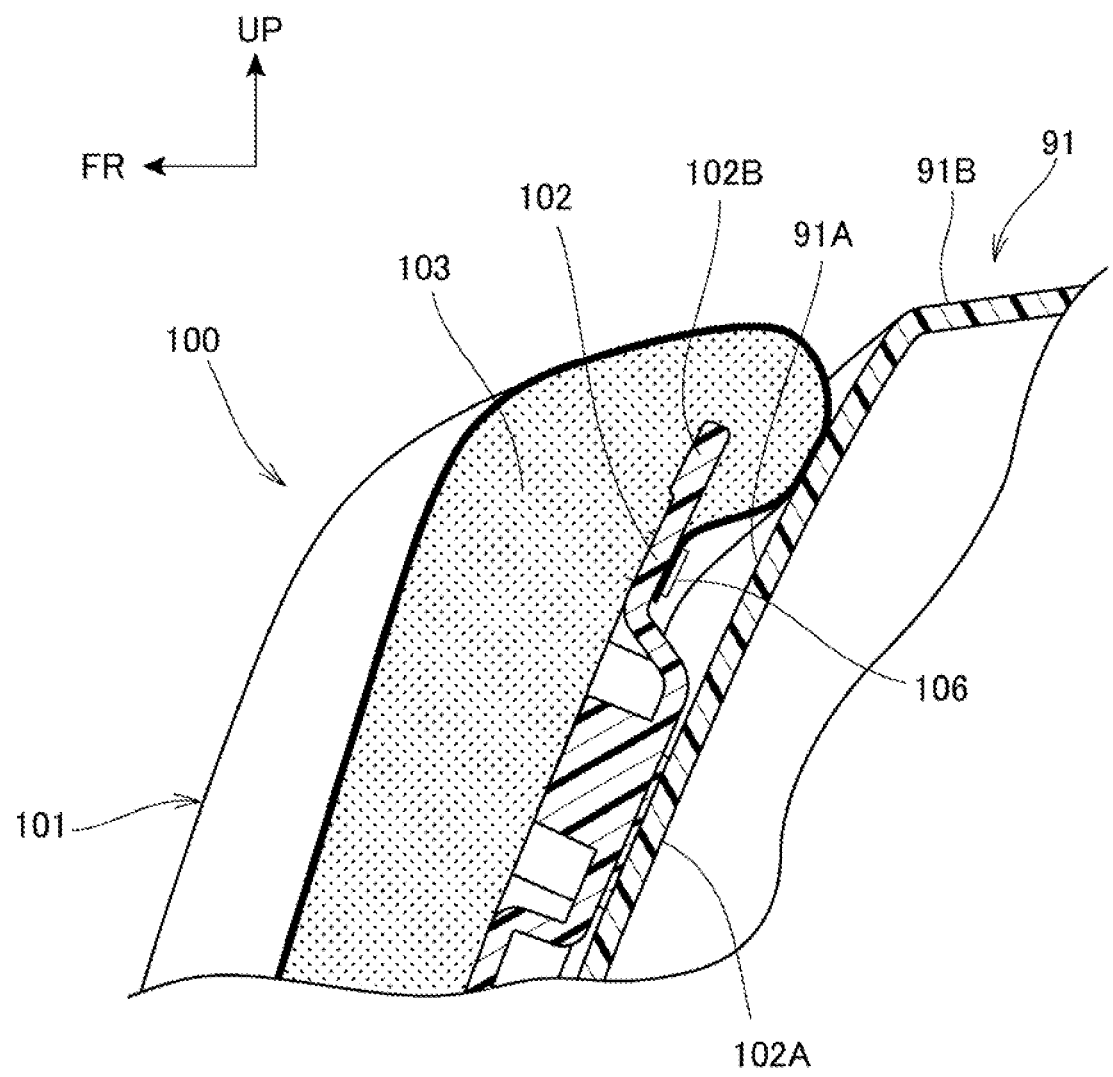
FIG. 14 is a longitudinal cross-sectional view of an upper part of the backrest.
Figure 15:
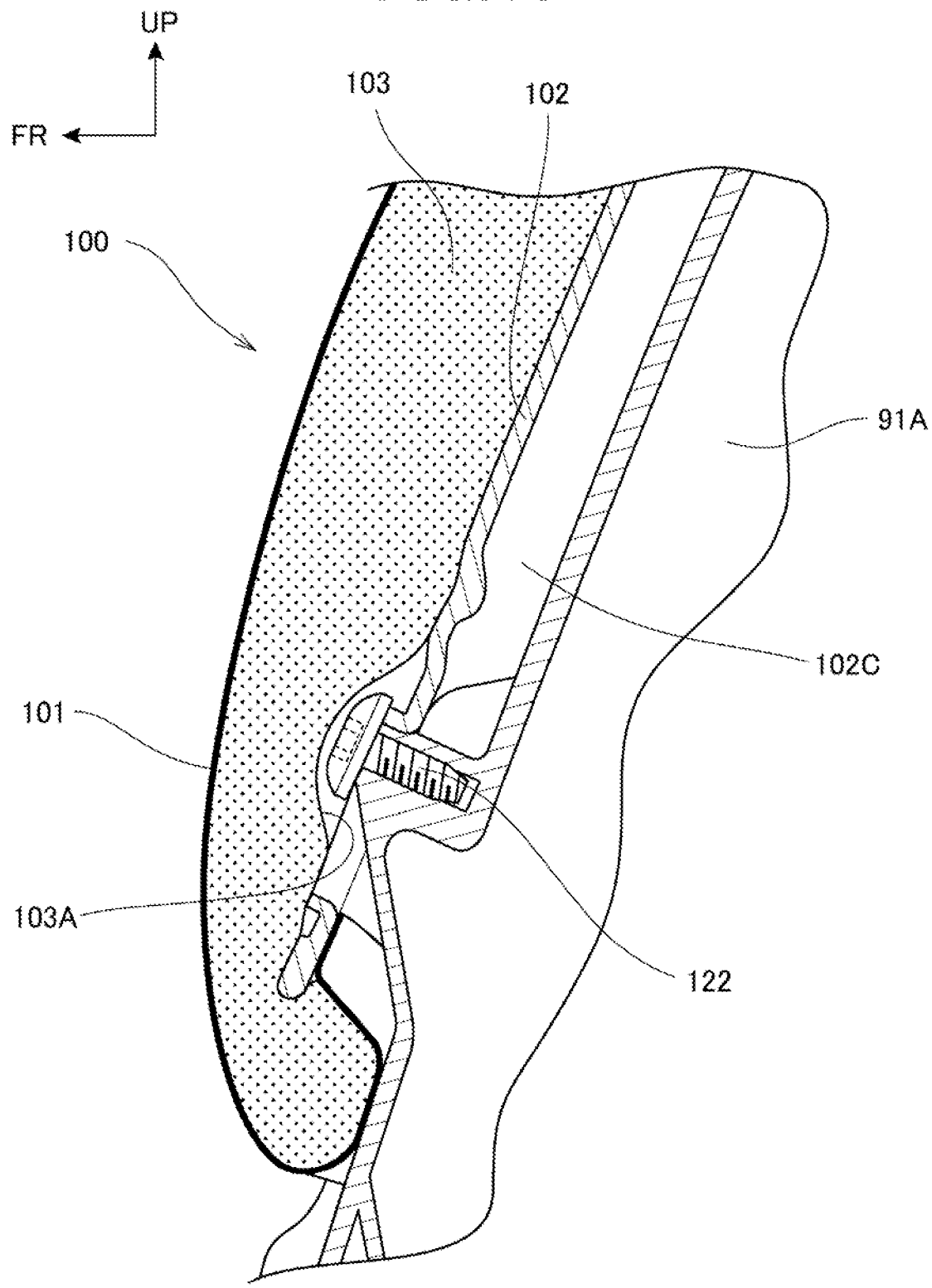
FIG. 15 is a longitudinal cross-sectional view of a mounting portion of the backrest.

FIG. 13 is a perspective view from a rear surface of the backrest 100 before mounted. FIG. 14 is a longitudinal cross-sectional view of an upper part of the backrest 100. FIG. 15 is a longitudinal cross-sectional view of a mounting portion of the backrest 100.

The backrest 100 has a plate shape extending in the left-right direction. The backrest 100 includes a bottom plate 102 disposed on the rear surface (back surface), a cushion 103 disposed on a front surface (in front) of the bottom plate 102, and a rest surface 101 that covers the cushion 103.

The bottom plate 102 has a trapezoidal shape that is long in the left-right direction. The bottom plate 102 includes a central body portion. Around a body portion 102A, an outer peripheral portion 102B having a shape recessed on a front side of the body portion 102A is formed. In the outer peripheral portion 102B, the rest surface 101 is fastened from the rear surface with a tucker 106 (see FIG. 14).

On lower left and right sides of the body portion 102A, mounting recesses 102C recessed forward are formed.

In a left mounting recess 102C, a left mounting hole (first engagement hole) 111 is formed. The left mounting hole 111 is a hole that penetrates the bottom plate 102 in the thickness direction. The left mounting hole 111 is formed by a round hole 111A having a diameter larger than a diameter of a head of a screw 121 (see FIG. 16), and a long hole 111B extending upward and having a width smaller than the diameter of the head of the screw 121 and larger than a diameter of a shaft of the screw 121.

A right mounting hole (second engagement hole) 112 is formed in a right mounting recess 102C. The right mounting hole 112 is a hole that penetrates the bottom plate 102 in the thickness direction. The right mounting hole 112 is formed by a long hole 112B extending downward from above, a lateral hole 112A formed at a lower end of the long hole 112B, the lateral hole extending orthogonally from the long hole 112B to the left, and a semicircular hole 112C formed at a left end of the lateral hole 112A. Here, the long hole 112B corresponds to the long hole 111B of the left mounting hole 111. A width of the lateral hole 112A in the up-down direction corresponds to the diameter of the round hole 111A of the left mounting hole 111. Furthermore, the semicircular hole 112C corresponds to the diameter of the round hole 111A of the left mounting hole 111.

A double-sided tape 104 is attached to the body portion 102A of the bottom plate 102 along an upper edge, a left edge and a right edge. A release paper 104A is attached to the double-sided tape 104 so as to protrude to an outer peripheral side of the backrest 100.

On the front surface of the bottom plate 102, the cushion 103 made of urethane resin or the like is disposed. The cushion 103 is formed into a size that can cover a front surface portion of the bottom plate 102. In the cushion 103, an escape portion 103A (see FIG. 15) recessed forward is formed, the escape portion corresponding to a portion including the mounting holes 111 and 112. The escape portion 103A formed makes it easy to avoid that the head of the screw 121 and a head of a screw 122 (see FIG. 16) entering the mounting holes 111 and 112 press the cushion 103. Since the cushion 103 is prevented from being pressed by the screws 121 and 122, the passenger leaning on the backrest 100 can hardly feel presence of the screws 121 and 122.

The cushion 103 is covered with the rest surface 101 and fixed to the bottom plate 102. The rest surface 101 is formed as a single surface by suturing together a top surface (first surface) 101A, a center surface (second surface) 101B, and a pair of left and right side surfaces (third surface). The rest surface 101 is fixed to the outer peripheral portion 102B of the bottom plate 102 with the tucker 106 (see FIG. 14). Here, the body portion 102A of the bottom plate 102 contacts the front surface (outer surface) 91A of the top box 90, and the outer peripheral portion 102B is in non-contact with the front surface 91A. Therefore, a tucker 106 part does not contact the top box 90. At this time, the cushion 103 is wound from the front surface to the rear surface of the bottom plate 102 so as to wind the outer peripheral portion 102B of the bottom plate 102, and the rest surface 101 is fastened with the tucker. Thereby, the passenger comes in contact with the outer peripheral portion 102B of the bottom plate 102 via the cushion 103, and usability is improved compared to a case where the passenger comes in contact with the portion without the cushion 103.

A portion formed by suturing the top surface 101A, the center surface 101B and the pair of left and right side surfaces, that is, a so-called stitch line 105 is provided so as to pass outer sides of the mounting holes 111 and 112 in the vehicle width direction. Thereby, when the passenger leans on the backrest 100, the stitch line 105 is not pushed by the screws 121 and 122, and the passenger's usability improves.

Figure 16:
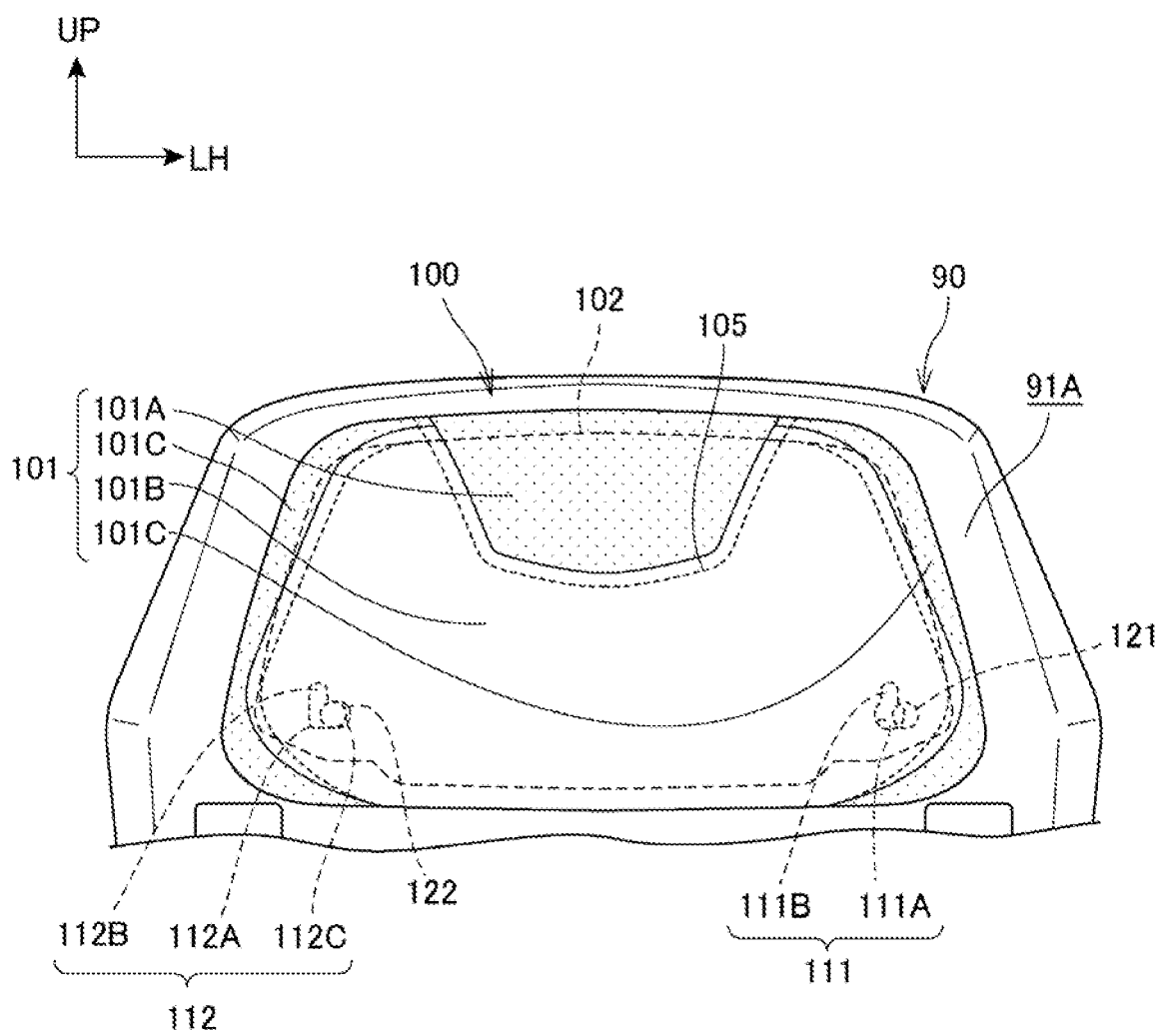
FIG. 16 is a view for explaining a method of mounting the backrest.

FIG. 16 is a view for explaining a method of mounting the backrest 100.

The screws 121 and 122 are screwed into the front surface 91A of the top box 90 at predetermined intervals in the left-right direction. The screws 121 and 122 are screwed to generate a gap corresponding to a thickness of the bottom plate 102 between the heads of the screws 121 and 122 and the front surface 91A.

An operator turns the bottom plate 102 forming the rear surface of the backrest 100 toward the top box 90, and disposes the bottom plate 102 along the front surface 91A. The operator also disposes the backrest 100 to align an upper edge of the backrest along an upper surface 91B of the top box 90. Further, the operator inserts the head of the screw 122 into the semicircular hole 112C of the right mounting hole 112. At this time, the head of the screw 121 does not enter the left mounting hole 111.

The operator slides the backrest 100 to the left while pushing rearward a lower left part of the backrest 100. Thereby, in the right mounting hole 112, the screw 122 moves from the semicircular hole 112C to the lateral hole 112A, and in the left mounting hole 111, the head of the screw 121 reaches a position of the round hole 111A, and the screw 121 enters the round hole 111A. Specifically, the screws 121 and 122 enter the left and right mounting holes 111 and 112. At this time, in the right mounting hole 112, a shaft of the screw 122 contacts a right edge of the lateral hole 112A and is positioned at a position of the long hole 112B. Further, as the bottom plate 102 is disposed along the front surface 91A, rattling occurs, and the operator can obtain a so-called feeling of mounting.

The operator then moves the backrest 100 downward. Thereby, in the right and left mounting holes 112 and 111, the shafts of the screws 122 and 121 enter the long holes 112B and 111B, and the shafts are positioned in contact with upper edges of the long holes 112B and 111B. At this time, the heads of the screws 122 and 121 are prevented from coming off, because the heads are larger than opening widths of the long holes 112B and 111B.

In this state, the operator can check whether or not one of the screws 122 and 121 is not fit or otherwise incorrectly attached, for example, by pulling the cushion 103 forward. When the operator determines that the screw is not incorrectly attached, the release paper 104A of the double-sided tape 104 is pulled from the rear surface and peeled off from the double-sided tape 104. The operator then presses the backrest 100 against the front surface 91A of the top box 90.

Thereby, the double-sided tape 104 is press-fitted to the top box 90, and the bottom plate 102 of the backrest 100 and the top box 90 are rigidly attached.

As described above, according to the first embodiment to which the present invention is applied, the saddle-ride vehicle 10 includes the front fender 26 that covers the front wheel 13 from above; the front fork 14, the front fork 14 including the fender support portion 44 that supports the front fender 26, the fender support portion 44 being located on the inner side of the vehicle body relative to the inner surface of the front fender 26; and the fork guard 75 disposed on the rear side of the fender support portion 44, the fork guard 75 extending to the inner side of the vehicle body relative to the fender support portion 44. In the saddle-ride vehicle 10, the front fender 26 includes the extending portion 76 extending from the inner surface of the front fender 26 to the inner side of the vehicle body, and the extending portion 76 is disposed in front of the space S0 formed between the fender support portion 44 and the inner surface of the front fender 26.

This configuration can provide the saddle-ride vehicle 10 that makes it difficult for the running wind entering the inner side of the front fender 26 to enter the space S0, that is, the air accumulation S0, the saddle-ride vehicle being capable of smoothly guiding the running wind entering the inner side of the front fender 26.

In the present embodiment, the fork guard 75 extends to the inner side of the vehicle body on the rear side of the fender support portion 44, the separating portion S1 that is partially separated in front of the fork guard 75 is formed between the fender support portion 44 and the inner surface of the front fender 26, and the rubber trim 84 that closes the separating portion S1 is provided in the separating portion S1.

According to this configuration, the closing of the separating portion S1 can make it difficult for the running wind entering the inner side of the front fender 26 to enter the air accumulation S0.

In the present embodiment, in the separating portion S1, the rib 77 extending from the inner surface of the front fender 26 to the inner side of the vehicle body is disposed, and the rubber trim 84 engages with the rib 77.

According to this configuration, the separating portion S1 can be closed with the rubber trim 84, which makes it difficult for the running wind entering the inner side of the front fender 26 to enter the air accumulation S0.

Further, in the present embodiment, the rubber trim 84 is disposed between the outer surface of the fender support portion 44 and the rib 77.

According to this configuration, the rib 77 can be closed while suppressing the extension amount of the rib.

Also, in the present embodiment, the rubber trim 84 is made of an elastically deformable resin.

This configuration can improve sealability of the separating portion S1, and make it easier to assemble the rubber trim 84 to the rib 77.

Additionally, in the present embodiment, the vibration isolation rubber 83 that isolates the fork guard 75 from vibration is provided between the fork guard 75 and the fender support portion 44.

This configuration can isolate the fork guard 75 from the vibration. Further, even if the fork guard 75 is brought close to the fender support portion 44, the generation of the contact noise due to the vibration with the fork guard 75 and the fender support portion 44 can be suppressed.

Second Embodiment

A second embodiment to which the present invention is applied will be described. In this second embodiment, a part configured in the same manner as in the above first embodiment is denoted with the same reference signs and description will be omitted.

Figure 17:
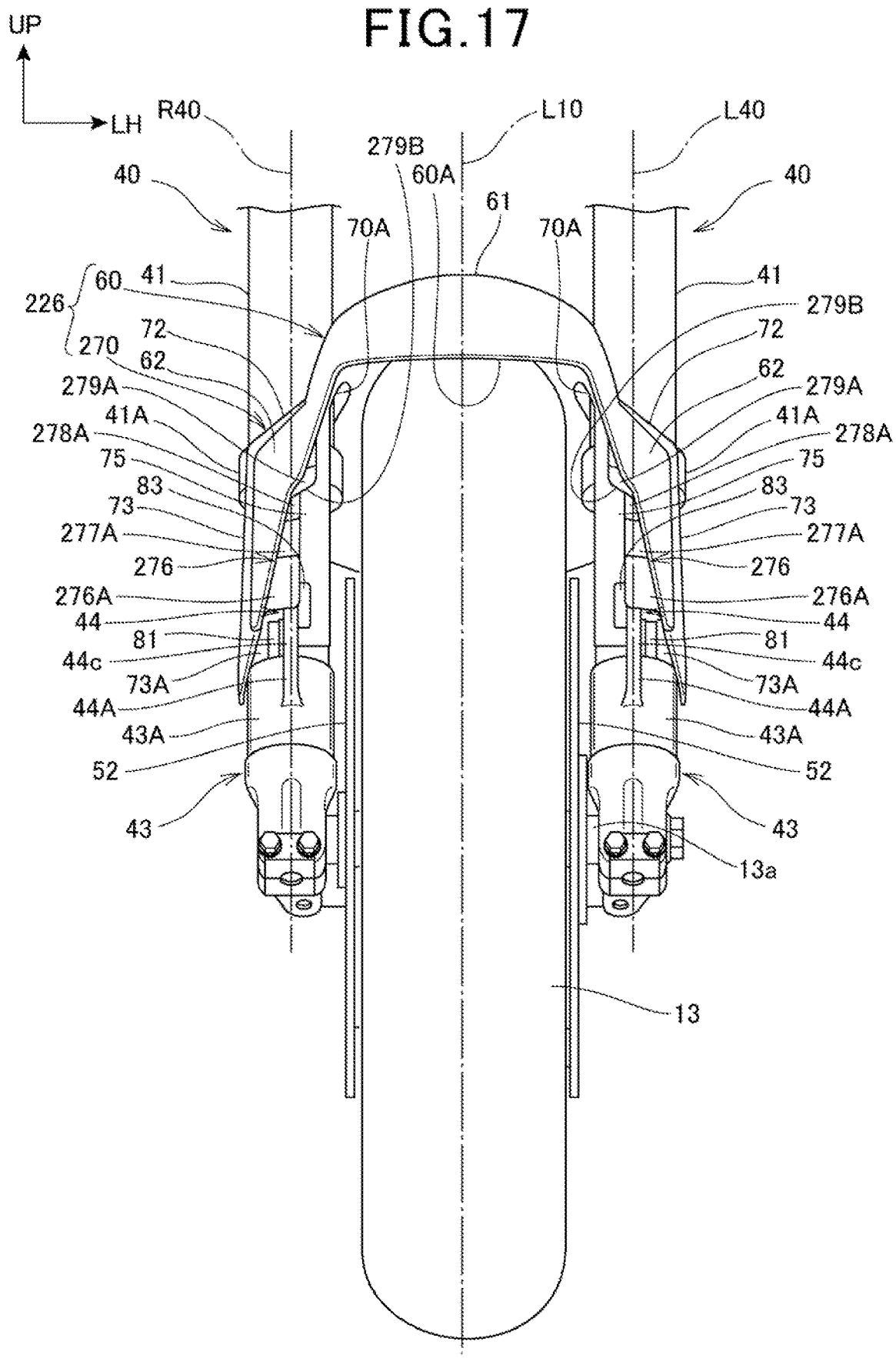
FIG. 17 is a front view showing a peripheral part of a front wheel of a saddle-ride vehicle according to a second embodiment.
Figure 18:
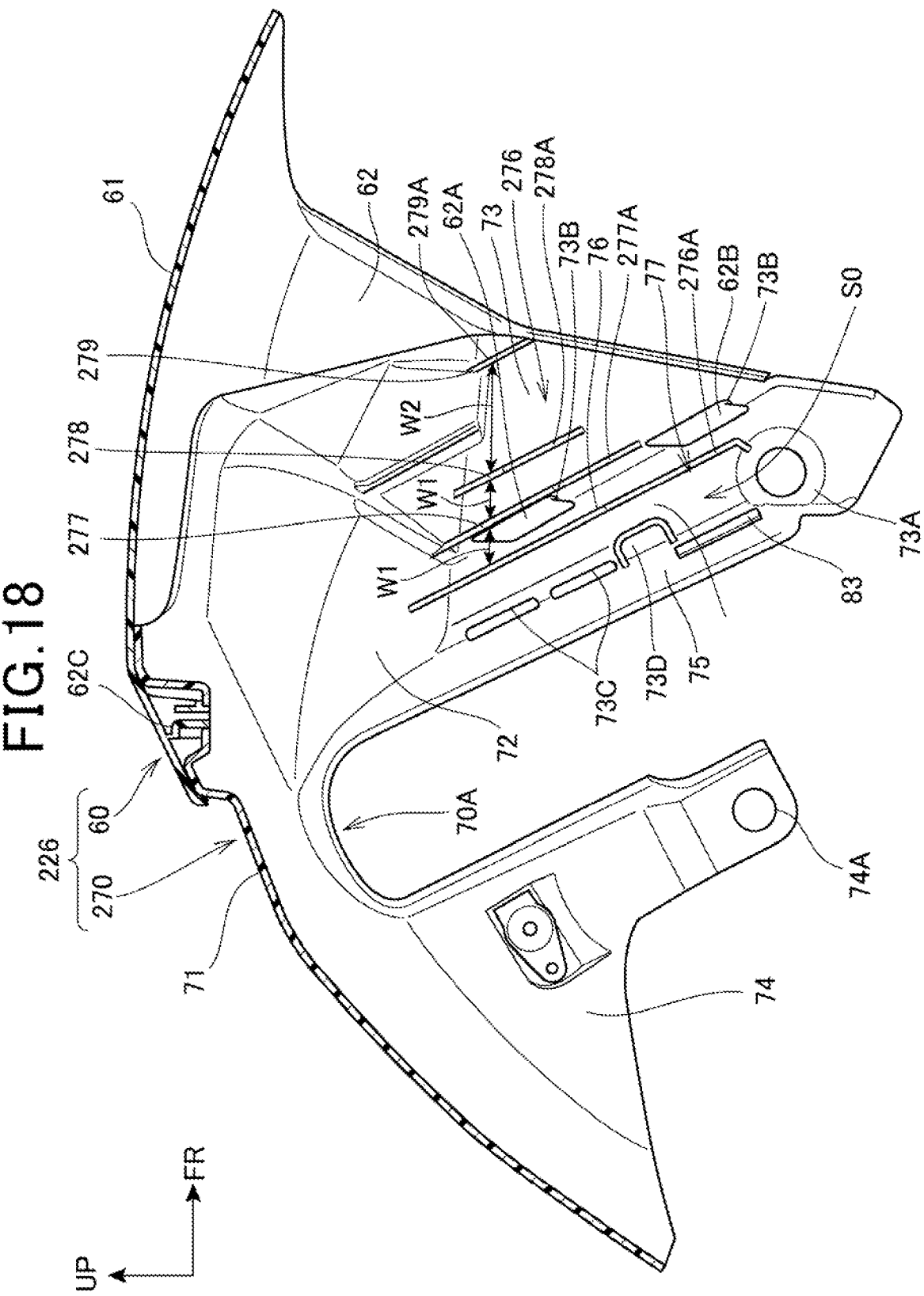
FIG. 18 is a cross-sectional view of a front fender along a vehicle centerline.
Figure 19:
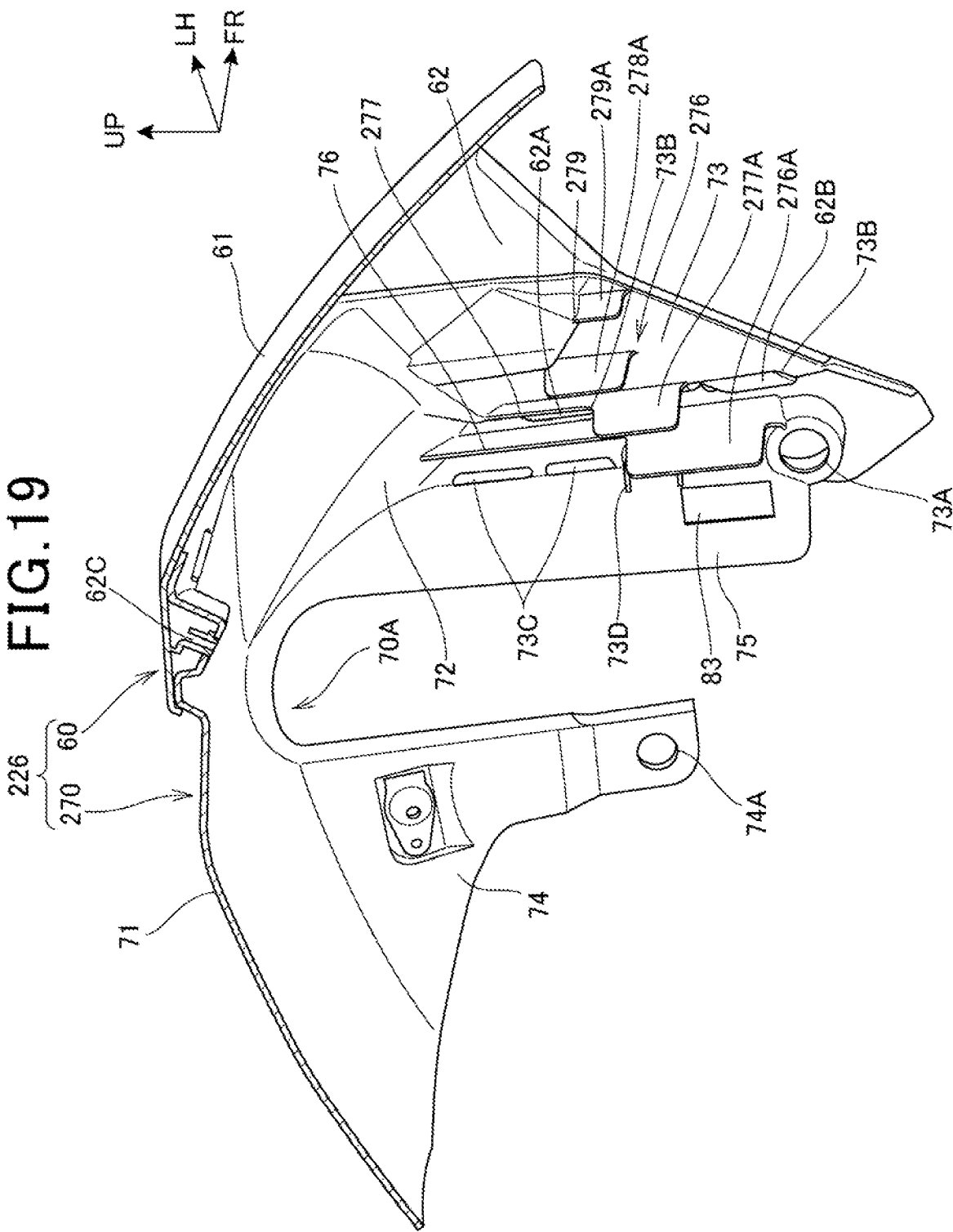
FIG. 19 is a view of a cross section of FIG. 18 seen in an oblique direction.
Figure 20:
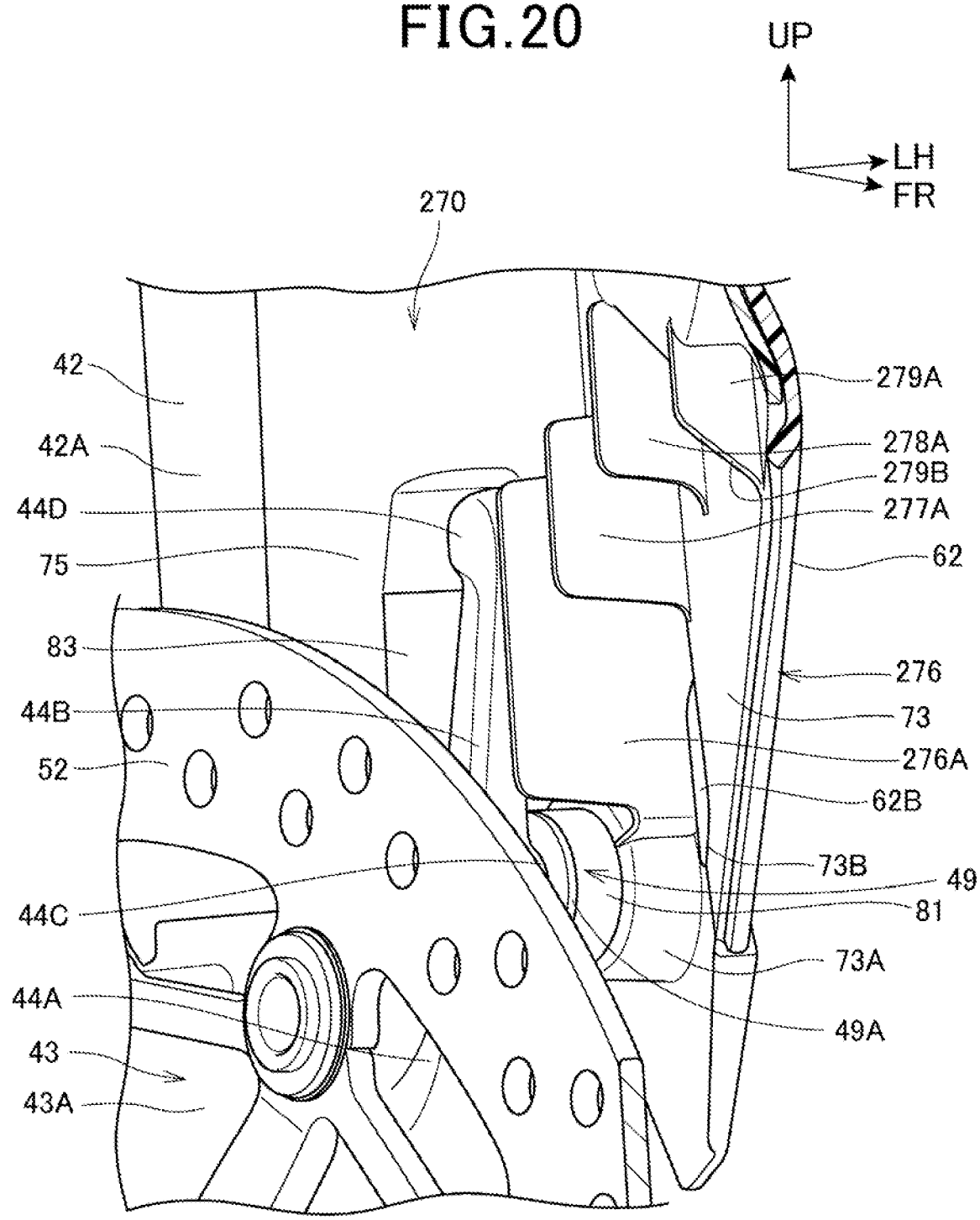
FIG. 20 is a perspective view showing a periphery of a fender support portion.

FIG. 17 is a front view showing a peripheral part of a front wheel 13 of a saddle-ride vehicle 10 according to the second embodiment. FIG. 18 is a cross-sectional view of a front fender 226 along a vehicle centerline L10. FIG. 19 is a view of a cross section of FIG. 18 seen in an oblique direction. FIG. 20 is a perspective view showing a periphery of a fender support portion 44.

The front fender 226 according to the second embodiment includes a fender body 270 in place of the fender body 70 according to the first embodiment. The fender body 270 is different from the fender body 70 according to the first embodiment in that the rib 77 is not provided and an extending portion 276 is provided.

The extending portion 276 includes a plurality of extending portions 76, 277, 278 and 279 including the extending portion 76.

At a lower end portion of the first extending portion 76, an extending portion body 276A is formed. The extending portion body 276A has an extension amount set to such a size that the extending portion body extends inward from an outer end face of the fender support portion 44 in a vehicle width direction. In particular, in the present embodiment, the extending portion body 276A is formed in a size of an extension amount such that the extending portion body extends inward from an inner end face of the fender support portion 44 in the vehicle width direction (see FIG. 17). The extending portion body 276A extends from a mounting portion 73A to an upper part of an engagement wall 73D. In front view, the extending portion body 276A overlaps with a connecting portion 44B of the fender support portion 44 (see FIGS. 17 and 20).

In front of the first extending portion 76, the second extending portion 277 is formed at a predetermined first interval W1 (see FIG. 18). The second extending portion 277 extends along the extending portion 76. The second extending portion 277 extends from a widening portion 72 to a position that overlaps with the engagement wall 73D in an up-down direction. At a lower end portion of the second extending portion 277, an extending portion body 277A is formed. The extending portion body 277A has an extending tip at a position (a tip position in the vehicle width direction) set in the same manner as in the extending portion body 276A (see FIG. 17). The second extending portion body 277A is formed with a length in the up-down direction being shorter than a length of the first extending portion body 276A. The second extending portion body 277A overlaps with an upper edge of the first extending portion body 276A (see FIGS. 17 and 20).

In front of the second extending portion 277, the third extending portion 278 is formed at a predetermined first interval W1 (see FIG. 18). The third extending portion 278 extends along the second extending portion 277. The third extending portion 278 extends from the widening portion 72 to a position above the engagement wall 73D in the up-down direction. At a lower end portion of the third extending portion 278, a third extending portion body 278A is formed. The third extending portion body 278A has an extending tip at a position that is set in the same manner as in the second extending portion body 277A (see FIG. 17). The third extending portion body 278A is formed with a length in the up-down direction being shorter than the length of the second extending portion body 277A. The third extending portion body 278A overlaps with an upper edge of the second extending portion body 277A (see FIGS. 17 and 20).

In front of the third extending portion 278, the fourth extending portion 279 is formed at a predetermined second interval W2 (see FIG. 18). The fourth extending portion 279 extends along the third extending portion 278. The fourth extending portion 279 extends downward from the widening portion 72 in the up-down direction. At the fourth extending portion 279, a fourth extending portion body 279A is formed. The fourth extending portion body 279A has an extending tip at a position that is set on an inner side of the third extending portion body 278A in the vehicle width direction (see FIG. 17). The fourth extending portion body 279A is formed with a length in the up-down direction being shorter than the length of the third extending portion body 278A. The fourth extending portion body 279A overlaps with an upper edge of the third extending portion body 278A (see FIGS. 17 and 20). A cutout 279B (see FIGS. 17 and 20) is formed at an inner end of the fourth extending portion body 279A in the vehicle width direction.

Figure 21:
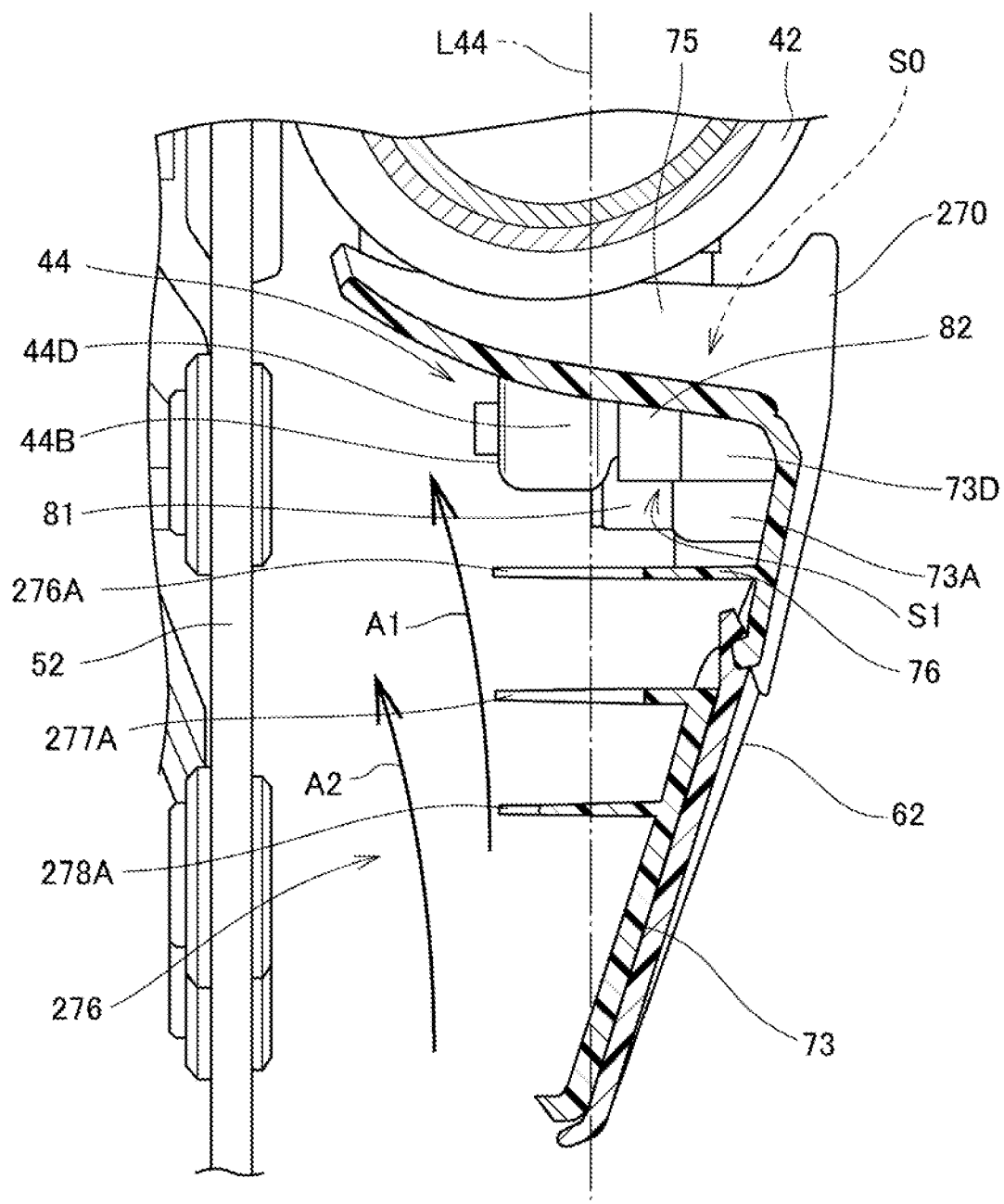
FIG. 21 is a view showing a relationship between the front fender and running wind according to the second embodiment.

FIG. 21 is a view showing a relationship between the front fender 226 and running wind according to the second embodiment.

When the running wind enters an inner side of the front fender 226 through an opening 60A of a fender front portion 60, as shown in FIG. 21, the outer end face of the fender support portion 44, that is, the extending portion 276 extending inward from a line L44 in the vehicle width direction regulates flow of the running wind into an air accumulation S0. Therefore, as shown by arrows A1 and A2, the running wind is easily guided to a front wheel 13 side, and is hard to enter the air accumulation S0.

In particular, in the extending portion 276 of the present embodiment, as shown in FIGS. 17, 19, and 20, the extending portion bodies 276A, 277A, 278A and 279A have a size that decreases toward a top in the up-down direction, and are disposed more proximally as being upward. Therefore, in such a structure, the running wind is gradually guided as being close to the air accumulation S0, and the running wind flowing to the inner side of the front fender 226 is easily guided in stages.

Here, also in the second embodiment, a front of the air accumulation S0 may be closed with a closing member. Specifically, in front of a fork guard 75, the closing member may be disposed in a separating portion S1 that separates the fender support portion 44 from an inner surface of the front fender 226, and the separating portion S1 may be closed with the closing member, to close the front of the air accumulation S0.

As described above, according to the second embodiment to which the present invention is applied, the saddle-ride vehicle 10 includes the front fender 226 that covers the front wheel 13 from above; a front fork 14, the front fork 14 including the fender support portion 44 that supports the front fender 226, the fender support portion 44 being located on an inner side of a vehicle body relative to the inner surface of the front fender 226; and the fork guard 75 disposed on a rear side of the fender support portion 44, the fork guard 75 extending to an inner side of the vehicle body relative to the fender support portion 44. In the saddle-ride vehicle 10, the front fender 226 includes the extending portion 276 extending from the inner surface of the front fender 226 to an inner side of the vehicle body, and the extending portion 276 is disposed in front of the space S0 formed between the fender support portion 44 and the inner surface of the front fender 226 (see FIGS. 18 and 21).

This configuration can provide the saddle-ride vehicle 10 that makes it difficult for the running wind entering the inner side of the front fender 226 to enter the air accumulation S0 and that can smoothly guide the running wind entering the inner side of the front fender 226.

In the second embodiment, the fork guard 75 extends to the inner side of the vehicle body on the rear side of the fender support portion 44, the separating portion S1 that is partially separated in front of the fork guard 75 is provided between the fender support portion 44 and the inner surface of the front fender 226, and the extending portion 276 extends to an inner side of the vehicle body relative to the outer surface of the fender support portion 44.

According to this configuration, the extending portion 276 extends to the inner side of the vehicle body relative to the outer surface of the fender support portion 44, which can more effectively make it difficult for the running wind entering the inner side of the front fender 226 to enter the air accumulation S0. The running wind entering the inner side of the front fender 226 can be smoothly guided.

Also, in the second embodiment, a plurality of extending portions 276 are provided, and the plurality of extending portions 76, 277, 278 and 279 are arranged at a predetermined distance away from one another in the front-rear direction, and the length of the extending portion bodies 276A, 277A, 278A and 279A of the plurality of extending portions 76, 277, 278 and 279 in the up-down direction increases as being rearward.

According to this configuration, the extending portion bodies 276A, 277A, 278A and 279A of the plurality of extending portions 76, 277, 278 and 279 can suppress intrusion of air flow, and the running wind flowing rearward can be gradually guided by the extending portion bodies 276A, 277A, 278A and 279A.

Other Embodiments

The above-described embodiments merely illustrate one aspect of the present invention, and can be arbitrarily modified and applied without departing from the scope of the present invention.

In the above first embodiment, the rib 77 includes three ribs extending in the front-rear direction, including the second rib 77B, the third rib 77C and the fourth rib 77D, but may include one or more arbitrary number of ribs.

In the first embodiment, it is desirable to provide, as the rib 77, the rib extending in the front-rear direction, but the ribs do not have to extend in the front-rear direction.

It has been described above in the second embodiment that the extending portion 276 includes, as the plurality of extending portions, four extending portions 76, 277, 278 and 279, but may include, as the plurality of extending portions, two or more arbitrary number of extending portions.

In the above embodiment, the configuration of the vibration isolation rubber 83 made of a rubber has been described as a vibration isolation pad, but a vibration isolation material is not limited to rubber. The material may be a sponge or a cloth, and any material can be applied as the vibration isolation pad, provided that the fork guard 75 can be isolated from vibration.

In the above embodiment, a motorcycle including the front wheel 13 and the rear wheel 15 has been described as an example of the saddle-ride vehicle 10, but the present invention is not limited to this example, and is applicable to a three-wheeled saddle-ride vehicle including two front or rear wheels, or a saddle-ride vehicle including four or more wheels.

Configurations Supported by the Above Embodiments

The above embodiments support the following configurations.

(Configuration 1) A saddle-ride vehicle including a front fender that covers a front wheel from above; a front fork, the front fork including a fender support portion that supports the front fender, the fender support portion being located on an inner side of a vehicle body relative to an inner surface of the front fender; and a fork guard disposed on a rear side of the fender support portion, the fork guard extending to an inner side of the vehicle body relative to the fender support portion, wherein the front fender includes an extending portion extending from the inner surface of the front fender to an inner side of the vehicle body, and the extending portion is disposed in front of a space formed between the fender support portion and the inner surface of the front fender.

This configuration can provide the saddle-ride vehicle that makes it difficult for running wind entering an inner side of the front fender to enter air accumulation, the saddle-ride vehicle being capable of smoothly guiding the running wind entering the inner side of the front fender.

(Configuration 2) The saddle-ride vehicle according to Configuration 1, wherein the fork guard extends to the inner side of the vehicle body on the rear side of the fender support portion, a separating portion that is partially separated in front of the fork guard is formed between the fender support portion and the inner surface of the front fender, and a closing member that closes the separating portion is provided in the separating portion.

According to this configuration, the closing of the separating portion can make it difficult for the running wind entering the inner side of the front fender to enter the air accumulation.

(Configuration 3) The saddle-ride vehicle according to Configuration 2, wherein in the separating portion, a rib extending from the inner surface of the front fender to the inner side of the vehicle body is disposed, and the closing member engages with the rib.

According to this configuration, the separating portion can be closed with the closing member, which makes it difficult for the running wind entering the inner side of the front fender to enter the air accumulation.

(Configuration 4) The saddle-ride vehicle according to Configuration 3, wherein the closing member is disposed between an outer surface of the fender support portion and the rib.

According to this configuration, the separating portion can be closed while suppressing an extension amount of the rib.

(Configuration 5) The saddle-ride vehicle according to Configuration 4, wherein the closing member is made of an elastically deformable resin.

This configuration can improve sealability of the separating portion, and make it easier to assemble the closing member to the rib.

(Configuration 6) The saddle-ride vehicle according to Configuration 1, wherein the fork guard extends to the inner side of the vehicle body on the rear side of the fender support portion, a separating portion that is partially separated in front of the fork guard is formed between the fender support portion and the inner surface of the front fender, and the extending portion extends to an inner side of the vehicle body relative to an outer surface of the fender support portion.

According to this configuration, the extending portion extends to the inner side of the vehicle body relative to the outer surface of the fender support portion, which can more effectively make it difficult for the running wind entering the inner side of the front fender to enter the air accumulation. The running wind entering the inner side of the front fender can be smoothly guided.

(Configuration 7) The saddle-ride vehicle according to Configuration 6, wherein a plurality of extending portions are provided, the plurality of extending portions are arranged at a predetermined distance away from one another in a front-rear direction, and a length of the plurality of extending portions in an up-down direction increases as being rearward.

According to this configuration, the plurality of extending portions can suppress intrusion of air flow, and the running wind flowing rearward can be gradually guided by the extending portions.

(Configuration 8) The saddle-ride vehicle according to any one of Configurations 1 to 7, wherein a vibration isolation pad that isolates the fork guard from vibration is provided between the fork guard and the fender support portion.

This configuration can isolate the fork guard from vibration. Further, even if the fork guard is brought close to the fender support portion, generation of contact noise due to vibration with the fork guard and the fender support portion can be suppressed.

REFERENCE SIGNS LIST

10 saddle-ride vehicle
13 front wheel
14 front fork
26 front fender
44 fender support portion
75 fork guard
76 first extending portion (extending portion)
77 rib
83 vibration isolation rubber (vibration isolation pad)
84 rubber trim (closing member)
226 front fender
276 extending portion
277 second extending portion (extending portion)
278 third extending portion (extending portion)
279 fourth extending portion (extending portion)
S0 space
S1 separating portion

What is claimed is:

1. A saddle-ride vehicle comprising:
   a front fender that covers a front wheel from above;
   a front fork, the front fork including a fender support portion that supports the front fender, the fender support portion being located on an inner side of a vehicle body relative to an inner surface of the front fender; and
   a fork guard disposed on a rear side of the fender support portion, the fork guard extending to an inner side of the vehicle body relative to the fender support portion,
   wherein an opening which opens forward at a vehicle centerline and inside which the front wheel is located in front view is formed to the front fender,
   the front fender includes an extending portion extending from the inner surface of the front fender to an inner side of the vehicle body and exposed to the opening of the front fender in front view, and
   the extending portion is disposed in front of a space formed between the fender support portion and the inner surface of the front fender.

2. The saddle-ride vehicle according to claim 1, wherein the fork guard extends to the inner side of the vehicle body on the rear side of the fender support portion,
   a separating portion that is partially separated in front of the fork guard is formed between the fender support portion and the inner surface of the front fender, and
   a closing member that closes the separating portion is provided in the separating portion.

3. The saddle-ride vehicle according to claim 2, wherein in the separating portion, a rib extending from the inner surface of the front fender to the inner side of the vehicle body is disposed, and the closing member engages with the rib.

4. The saddle-ride vehicle according to claim 3, wherein the closing member is disposed between an outer surface of the fender support portion and the rib.

5. The saddle-ride vehicle according to claim 4, wherein the closing member is made of an elastically deformable resin.

6. The saddle-ride vehicle according to claim 1, wherein the fork guard extends to the inner side of the vehicle body on the rear side of the fender support portion, a separating portion that is partially separated in front of the fork guard is formed between the fender support portion and the inner surface of the front fender, and the extending portion extends to an inner side of the vehicle body relative to an outer surface of the fender support portion.

7. The saddle-ride vehicle according to claim 6, wherein a plurality of extending portions are provided, the plurality of extending portions are arranged at a predetermined distance away from one another in a front-rear direction, and a length of the plurality of extending portions in an up-down direction increases as being rearward.

8. The saddle-ride vehicle according to claim 1, wherein a vibration isolation pad that isolates the fork guard from vibration is provided between the fork guard and the fender support portion.

9. A saddle-ride vehicle comprising:
   a front fender that covers a front wheel from above;
   a front fork, the front fork including a fender support portion that supports the front fender, the fender support portion being located on an inner side of a vehicle body relative to an inner surface of the front fender; and
   a fork guard disposed on a rear side of the fender support portion, the fork guard extending to an inner side of the vehicle body relative to the fender support portion,
   wherein the front fender includes an extending portion extending from the inner surface of the front fender to an inner side of the vehicle body, and
   the extending portion is disposed in front of a space formed between the fender support portion and the inner surface of the front fender,
   wherein the fork guard extends to the inner side of the vehicle body on the rear side of the fender support portion,
   a separating portion that is partially separated in front of the fork guard is formed between the fender support portion and the inner surface of the front fender, and
   a closing member that closes the separating portion is provided in the separating portion.

10. A saddle-ride vehicle comprising:
   a front fender that covers a front wheel from above;
   a front fork, the front fork including a fender support portion that supports the front fender, the fender support portion being located on an inner side of a vehicle body relative to an inner surface of the front fender; and
   a fork guard disposed on a rear side of the fender support portion, the fork guard extending to an inner side of the vehicle body relative to the fender support portion,
   wherein the front fender includes an extending portion extending from the inner surface of the front fender to an inner side of the vehicle body, and
   the extending portion is disposed in front of a space formed between the fender support portion and the inner surface of the front fender,
   wherein the fork guard extends to the inner side of the vehicle body on the rear side of the fender support portion, a separating portion that is partially separated in front of the fork guard is formed between the fender support portion and the inner surface of the front fender, and the extending portion extends to an inner side of the vehicle body relative to an outer surface of the fender support portion.

* * * * *